(12) United States Patent
Silva et al.

(10) Patent No.: US 8,937,899 B2
(45) Date of Patent: Jan. 20, 2015

(54) AMPLIFY-AND-FORWARD RELAYING IN COMMUNICATION SYSTEMS

(75) Inventors: Yuri C. B. Silva, Fortaleza (BR); Pedro R. S. Lopes, Fortaleza (BR); Francisco R. P. Cavalcanti, Fortaleza (BR); Peter Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 784 days.

(21) Appl. No.: 13/110,285

(22) Filed: May 18, 2011

(65) Prior Publication Data

US 2012/0294224 A1   Nov. 22, 2012

(51) Int. Cl.
H04B 7/14 (2006.01)
H04B 7/155 (2006.01)

(52) U.S. Cl.
CPC .................. *H04B 7/15521* (2013.01)
USPC ......................................... 370/315

(58) Field of Classification Search
CPC . H04B 7/2606; H04B 7/15507; H04W 88/04; H04W 52/46; H04W 84/047
USPC ............................ 370/315, 345; 455/7, 127.2
See application file for complete search history.

(56) References Cited

U.S. PATENT DOCUMENTS

| | | | |
|---|---|---|---|
| 7,336,930 B2 * | 2/2008 | Larsson et al. | 455/63.1 |
| 2008/0318520 A1 * | 12/2008 | Kwun et al. | 455/7 |
| 2009/0268662 A1 * | 10/2009 | Larsson et al. | 370/328 |
| 2010/0151793 A1 * | 6/2010 | Wang et al. | 455/67.11 |
| 2010/0278169 A1 * | 11/2010 | Wang et al. | 370/345 |
| 2010/0317361 A1 * | 12/2010 | Hu et al. | 455/450 |
| 2011/0216813 A1 * | 9/2011 | Baldemair et al. | 375/211 |
| 2012/0201189 A1 * | 8/2012 | Jung et al. | 370/315 |
| 2012/0250606 A1 * | 10/2012 | Gao et al. | 370/315 |
| 2013/0010840 A1 * | 1/2013 | Maddah-Ali et al. | 375/211 |

FOREIGN PATENT DOCUMENTS

| | | | | |
|---|---|---|---|---|
| WO | 2006/071187 A2 | 7/2006 | | |
| WO | WO 2010056165 A1 * | 5/2010 | | H04B 7/155 |

OTHER PUBLICATIONS

PCT International Search Report, mailed Sep. 27, 2012, in connection with International Application No. PCT/SE2012/050427.
PCT Written Opinion, mailed Sep. 27, 2012, in connection with International Application No. PCT/SE2012/050427.

(Continued)

*Primary Examiner* — Brandon Renner
*Assistant Examiner* — Scott M Sciacca
(74) *Attorney, Agent, or Firm* — Patent Portfolio Builders PLLC

(57) ABSTRACT

Improved amplify-and-forward relaying in a communication network is described, including an example network of multiple single-antenna mobile stations, a multi-antenna relay station, and a multi-antenna base station. Bi-directional communication with improved transmission efficiency is enabled by suitable transmit/receive processing at the relay station without drawbacks of current relaying techniques. Linear transmit and receive processing matrices are disclosed, and it is shown that the numbers of antennas at the relay station and the base station can be substantially the same without reducing network capacity, closely matching the performance for low and high signal to noise ratios of current techniques that require the relay station to have twice as many antennas as the base station.

22 Claims, 6 Drawing Sheets

(56) References Cited

OTHER PUBLICATIONS

Shimpei Toh et al. "A linear beamforming scheme for multi-user MIMO AF two-phase two-way relaying", IEEE 20th International Symposium on Personal, Indoor and Mobile Radio Communications (PIMRC 2009), IEEE, Piscataway, NJ, USA, Sep. 13, 2009, pp. 1003-1007, XP031660013, ISBN: 978-1-4244-5122-7.

Zhiguo Ding et al. "Physical Layer Network Coding and Precoding for the Two-Way Relay Channel in Cellular Systems", IEEE Transactions on Signal Processing, IEEE Service Center, New York, NY, US, vol. 59, No. 2, Feb. 1, 2011, pp. 696-712, XP011341711, ISSN: 1053-587X.

Wei Xu et al. "Joint Precoding Optimization for Multiuser Multi-Antenna Relaying Downlinks Using Quadratic Programming" IEEE Transactions on Communications, IEEE Service Center, Piscataway, NJ, USA, vol. 59, No. 5, May 1, 2011, pp. 1228-1235, XP011322163, ISSN: 0090-6778.

Larsson, P. et al. "Coded Bi-directional Relaying" Proc. IEEE Vehicular Technology Conference (VTC), vol. 2, pp. 851-855, May 2006.

Unger, T. et al. "Duplex Schemes in Multiple Antenna Two-Hop Relaying" EURASIP Journal on Advances in Signal Processing, vol. 2008, Article ID 128592, pp. 1-14, Hindawi Publishing Company, doi: 10.1155/2008/128592.

Popovski, P. et al. "Bi-directional Amplification of Throughput in a Wireless Multi-Hop Network" Proc. IEEE Vehicular Technology Conference (VTC), vol. 2, pp. 588-593, May 2006.

* cited by examiner

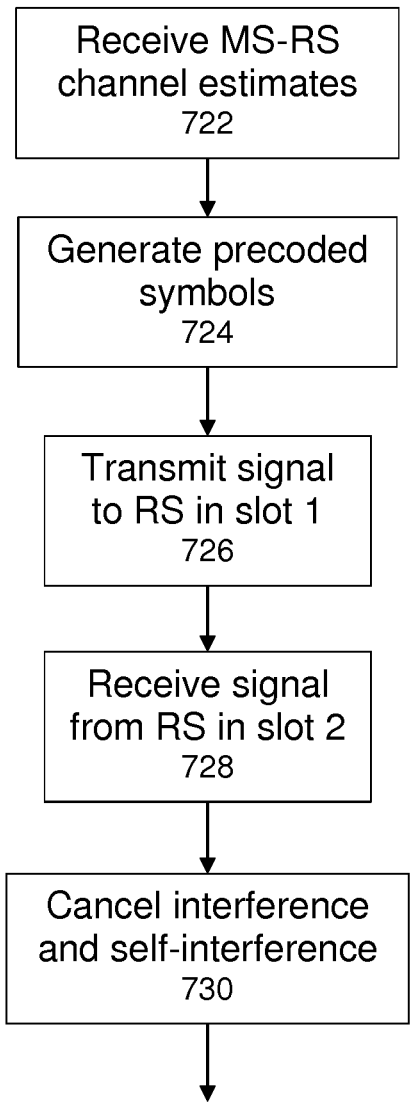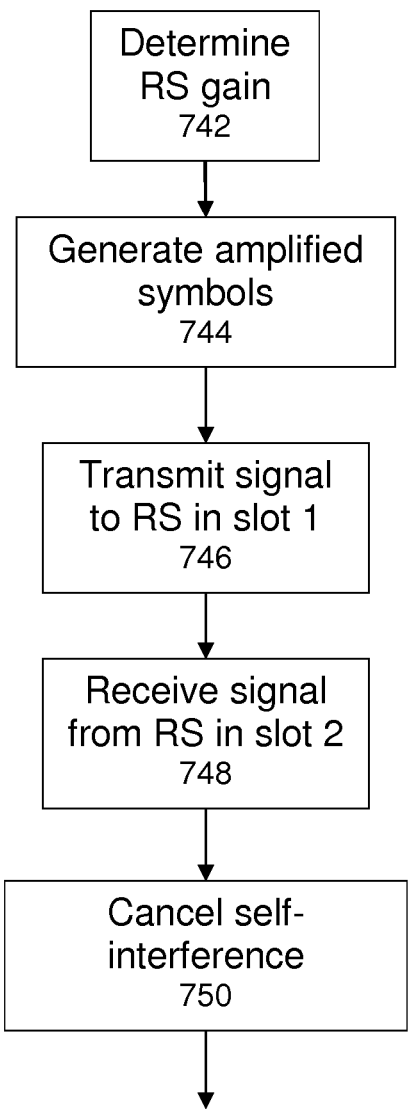
FIG. 7B
FIG. 7C

AMPLIFY-AND-FORWARD RELAYING IN COMMUNICATION SYSTEMS

TECHNICAL FIELD

This application relates to wireless communication systems, and in particular to cellular radio telephone communication systems.

BACKGROUND

In wireless cellular networks, the deployment of fixed relay stations has been considered as an alternative for improving not only cell coverage but also transmission efficiency. Recent studies have focused on the analysis of adequate deployment scenarios, taking into account aspects such as the cost/efficiency trade-off of relay stations and resource allocation issues. Bi-directional communication is considered, in which a Mobile Station (MS) and a Base Station (BS) communicate with each other through a Relay Station (RS).

FIG. 1 depicts a general system model of a wireless communication system 100 that includes a BS 110 having a plurality of antennas 112, an RS 120 having another plurality of antennas 122, and a plurality of MSs 130-1, 130-2, ..., 130-N. Each of the N MSs has a single antenna. As depicted in FIG. 1, the MSs, or users, cannot connect directly to the BS, e.g., because they are in a situation of strong shadow fading, and so the MSs and BS use two-hop communication through the RS. The artisan will recognize that a typical wireless network includes many base stations and can include many relay stations.

Networks such as the example depicted in FIG. 1 have been studied. For example, P. Popovski and H. Yomo, "Bi-Directional Amplification of Throughput in a Wireless Multi-Hop Network", Proc. IEEE Vehicular Technology Conf. (VTC), vol. 2, pp. 588-593 (May 2006) and T. Unger and A. Klein, "Duplex Schemes in Multiple Antenna Two-Hop Relaying", EURASIP J. Advances in Signal Processing, vol. 2008, pp. 1-14 (2008) consider cases where there is a single MS/BS pair communicating through an RS, or more recently with multiple pairs sharing a same relay.

Assuming the availability of one or more relay stations within a cell that enable two-hop communication between MS/BS pairs, bi-directional relaying has appeared to be a way to improve system performance. Bi-directional relaying can make it possible to implement both downlink and uplink communication with the least amount of resources.

Previous work has investigated bi-directional relaying techniques employing both Amplify-and-Forward (AF) and Decode-and-Forward (DF) techniques. FIG. 2 schematically depicts one-way AF relaying transmission from a first node i to a second node j through the relay station r. It will be understood from FIG. 1 that the nodes i, j can be any of the MSs 130 and the BS 110. A wireless signal transmitted by the node i during a first time period, which can be called a time slot, typically includes one or more information symbols $s_{i,j}$ intended for the node j. The wireless signal transmitted by the node i is modified by passage through a communication channel to the relay station r according to the channel's impulse response $h_{i,r}$. During a succeeding time slot, the relay station r transmits a signal that can be denoted $y_r$ to the node j, and that signal is modified by passage through another communication channel to the node j according to the channel's impulse response $h_{r,j}$. It will be understood that the reverse-direction communication from node j to node i will take two further time slots.

In order to provide bi-directional communication, either self-interference cancellation (for AF relaying) or network coding (for DF relaying) can be employed. The above-cited publication by Popovski et al. and U.S. Pat. No. 7,336,930 to Larsson et al. for "Interference Cancellation in Wireless Relaying Networks" (Feb. 26, 2008) describe uses of self-interference cancellation. U.S. Patent Application Publication No. US 2009/0268662A1 by P. Larsson, N. Johansson, and K. Sunell for "Method and Arrangement for Bi-Directional Relaying in Wireless Communication Systems" (Oct. 29, 2009) and P. Larsson, N. Johansson, and K.-E. Sunell, "Coded Bi-Directional Relaying", Proc. IEEE VTC, vol. 2, pp. 851-855 (May 2006) describe uses of network coding. In addition, through the use of multi-antenna network elements, it is also possible to implement bi-directional communication, such as described in the above-cited publication by Unger et al.

A problem with existing implementations of two-hop bi-directional communication in a network such as depicted in FIG. 1 is that the number of antennas required at the RS is exceedingly high, if simultaneous transmission of all MS-BS pairs is desired, or the time required to complete communication can be exceedingly long, if the MS-BS pairs are sequentially served. In order to bi-directionally serve N MSs simultaneously, an N-antenna BS and a 2N-antenna RS are required. Since it is desirable for an RS to be a low-cost version of a BS, an RS with so many more antennas than the BS can preclude use of relaying in practical networks.

SUMMARY

This invention provides methods and apparatus for amplify-and-forward relay communication that enable simultaneous bi-directional communication between mobile stations and a base station via a relay station in a wireless cellular communication network. The relay station and the base station can have substantially the same number of antennas, and the mobile stations and the base station are able to cancel their own known interference from their received signals.

In accordance with aspects of this invention, there is provided a method in a node for a cellular communication system of relaying respective first wireless signals from a plurality of mobile stations to a base station and a second wireless signal from the base station to the plurality of mobile stations. The method includes receiving the first and second wireless signals through at least two antennas in the node during a first time slot of two successive time slots, where each of the first wireless signals includes a respective symbol and the second wireless signals includes a plurality of symbols; generating respective estimates of the symbols in the first and second wireless signals received during the first time slot, including canceling interference between symbols based on respective first estimates of a channel characteristic of respective first communication channels between the mobile stations and the node and on a second estimate of a channel characteristic of a second communication channel between the base station and the node; generating a first relay signal based on the estimates of the symbols of the first wireless signals and a second relay signal based on the estimates of the plurality of symbols of the second wireless signal, including precoding the estimates of the symbols in the first and second wireless signals received during the first time slot by at least amplifying estimates by a gain factor and canceling interference between the symbols; providing the gain factor to the plurality of mobile stations; and providing the first estimates of the channel characteristic to the base station.

In accordance with aspects of this invention, there is provided an apparatus for a relay station for a wireless communication network, for relaying first wireless signals from mobile stations to a base station and a second wireless signal from the base station to the mobile stations. The apparatus includes a receiver configured for receiving the first and second wireless signals through at least two antennas during a first time slot of two successive time slots, where each of the first wireless signals includes a respective symbol and the second wireless signals includes a plurality of symbols; a programmable control circuit configured for generating respective estimates of the symbols in the first and second wireless signals received during the first time slot by at least canceling interference between symbols based on respective first estimates of a channel characteristic of respective first communication channels between the mobile stations and the relay station and on a second estimate of a channel characteristic of a second communication channel between the base station and the relay station; the programmable control circuit being further configured for generating a first relay signal based on the estimates of the symbols of the first wireless signals and a second relay signal based on the estimates of the plurality of symbols of the second wireless signal by precoding the estimates of the symbols in the first and second wireless signals received during the first time slot, the precoding including at least amplifying estimates by a gain factor and canceling interference between the symbols; and a transmitter configured for providing the gain factor to the plurality of mobile stations and the first estimates of the channel characteristic to the base station.

Also in accordance with aspects of this invention, there is provided an apparatus for a mobile station for a wireless communication network, in which a first wireless signal from the mobile station is relayed by a relay station to a base station and a second wireless signal from the base station is relayed by the relay station to the mobile station. The apparatus includes an antenna for transmitting the first wireless signal during a first time slot of two successive time slots and for receiving the second wireless signal during a second time slot of the two successive time slots, where the first wireless signal includes an amplified symbol and the second wireless signal includes a plurality of symbols; a receiver configured for extracting information from a received second wireless signal; an electronic control circuit configured for determining, based on information extracted by the receiver, a gain factor of the relay station; for extracting a symbol intended for the mobile station from the second wireless signal; for generating a channel estimate of a communication channel between the mobile station and the relay station; for canceling self-interference from the symbol intended for the mobile station based on the gain factor and the channel estimate; and for generating the amplified symbol for the first wireless signal in a first time slot; and a transmitter configured for generating the first wireless signal including the amplified symbol.

Also in accordance with aspects of this invention, there is provided a method in a mobile station for a wireless communication network, in which a first wireless signal from the mobile station is relayed by a relay station to a base station and a second wireless signal from the base station is relayed by the relay station to the mobile station. The method includes transmitting the first wireless signal during a first time slot of two successive time slots and receiving the second wireless signal during a second time slot of the two successive time slots, where the first wireless signal includes an amplified symbol and the second wireless signal includes a plurality of symbols; extracting information from a received second wireless signal; determining, based on information extracted, a gain factor of the relay station; extracting a symbol intended for the mobile station from the second wireless signal; generating a channel estimate of a communication channel between the mobile station and the relay station; canceling self-interference from the symbol intended for the mobile station based on the gain factor and the channel estimate; and generating the amplified symbol for the first wireless signal in a first time slot.

Also in accordance with aspects of this invention, there is provided an apparatus for a base station for a wireless communication network, where a first wireless signal from the base station is relayed by a relay station to a plurality of mobile stations and a plurality of wireless signals from the plurality of mobile stations is relayed by the relay station in a second wireless signal to the base station. The apparatus includes at least two antennas configured for transmitting the first wireless signal during a first time slot of two successive time slots and receiving the second wireless signal during a second time slot of the two successive time slots, where the first wireless signal includes a plurality of symbols, each intended for a respective mobile station; a receiver configured for extracting information from a received second wireless signal; an electronic control circuit configured for determining, based on information extracted by the receiver, respective channel estimates for communication channels between the relay station and the plurality of mobile stations; for generating respective precoded symbols for the plurality of mobile stations for the first wireless signal in the first time slot; and for canceling interference and self-interference between symbols in the received second wireless signal based on the respective channel estimates; and a transmitter configured for generating the first wireless signal including the precoded symbols.

Also in accordance with aspects of this invention, there is provided a method in a base station for a wireless communication network, where a first wireless signal from the base station is relayed by a relay station to a plurality of mobile stations and a plurality of wireless signals from the plurality of mobile stations is relayed by the relay station as a second wireless signal to the base station. The method includes transmitting the first wireless signal during a first time slot of two successive time slots and receiving the second wireless signal during a second time slot of the two successive time slots, where the first wireless signal includes a plurality of symbols, each intended for a respective mobile station; extracting information from a received second wireless signal; determining, based on information extracted by the receiver, respective channel estimates for communication channels between the relay station and the plurality of mobile stations; generating respective precoded symbols for the plurality of mobile stations for the first wireless signal in the first time slot; canceling interference and self-interference between symbols in the received second wireless signal based on the respective channel estimates; and generating the first wireless signal including the precoded symbols.

BRIEF DESCRIPTION OF THE DRAWINGS

The several features, objects, and advantages of this invention will be understood by reading this description in conjunction with the drawings, in which:

FIGS. 7A, 7B, 7C are flow charts of improved methods of amplify-and-forward relay communication.

DETAILED DESCRIPTION

Figure 1:
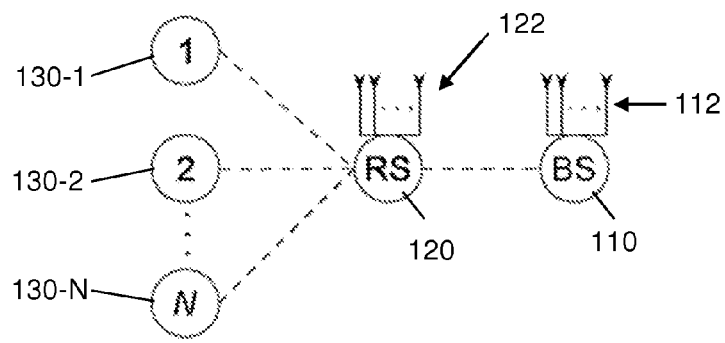
FIG. 1 depicts a communication network with a relay station between a base station and mobile stations.

This application focuses on examples in which there are multiple MSs, a single BS, and a single RS between the MSs and BS, but the artisan will understand this invention is not limited to such examples. The examples described below are analyzed with a view to improving transmission efficiency, including Multiple Input Multiple Output (MIMO) for multi-antenna relay stations and base stations. As described below, it is feasible with existing technology to apply MIMO transmit/receive processing at an RS to enable bi-directional communication as described below (single multi-antenna RS, single multi-antenna BS, and multiple single-antenna MSs) without the drawbacks of currently known techniques. Linear transmit and receive processing matrices are derived for both the RS and BS, and it is shown that the numbers of antennas at the BS and RS can be substantially the same without reducing network capacity, closely matching the performance for low and high signal to noise ratios (SNRs) of conventional techniques that require the RS to have twice as many antennas as the BS.

The AF relaying technique, in which the received estimates of the data symbols are further transmitted without any attempt at decoding by the relay station, is considered by all algorithms described below. In spite of undesirable noise amplification that AF relaying can present, AF relaying can have good performance in many scenarios, with the benefit of lower implementation complexity than DF relaying techniques. In the following analyses, it is further assumed that each user (MS) has data to send to the BS, and that the BS has data to send to each user (MS).

In order to have a common framework for comparing the algorithms, a single frequency resource is considered, with the nodes' orthogonal transmissions separated in the temporal or spatial domains.

Let C denote the sum rate of the transmission between the users (MSs) and BS in both directions that is given by the following:

$$C = \frac{1}{T} \sum_{i=1}^{N} \{\log_2(1 + \gamma_{u_i,b}) + \log_2(1 + \gamma_{b,u_i})\} \quad \text{Eq. 1}$$

in which T is a number of time resources required, N is the number of users u, $\gamma_{u_i,b}$ is an equivalent signal-to-noise ratio (SNR) between an i-th user $u_i$ and the BS b, and $\gamma_{b,u_i}$ is the equivalent SNR between the BS b and i-th user $u_i$.

The channel between each pair of antennas is assumed to be a zero-mean, circularly symmetric, complex Gaussian random variable having unit variance $z \in \mathbb{C}$ and a path-loss component $L \in \mathbb{R}$, i.e., $h_{i,j} = \sqrt{L_{i,j}} z_{i,j}$, where the indices i and j simply identify the antennas i, j at the ends of the channel, and $h_{i,j}$ is an estimate of the channel characteristics (typically, the channel's impulse response). It is also assumed that the channels are reciprocal, i.e., $h_{i,j} = h_{j,i}$. Let $\sigma_u^2$, $\sigma_r^2$ and $\sigma_b^2$ denote the additive white gaussian noise (AWGN) variances of the users, RS, and BS, respectively, and $P_u$, $P_r$, and $P_b$ denote the transmit power constraints of the users, RS, and BS, respectively.

In addition, a flat-fading channel is assumed, such that there is no inter-symbol interference, and the channel is considered to remain approximately constant for a period of time during which several symbols can be transmitted subject to different noise samples. When calculating the average SNR for a given channel realization, it can thus be assumed that the channel is constant and symbol and noise are random variables, of which expected values can be determined.

Known Relaying Algorithms

In this section, some previously known relaying algorithms are formulated and described to establish a common framework for comparison with the improved algorithms described in the next section.

A first algorithm corresponds to simple one-way AF relaying (see FIG. 2), where each transmission occupies a respective time slot. Next comes two-way AF relaying, which accepts symbol superposition. The third algorithm assumes a two-antenna RS for performing interference cancellation. The fourth algorithm corresponds to multi-way AF relaying, i.e., communication between multiple users and the BS takes place simultaneously, but requires a 2N-antenna RS and an N-antenna BS.

One-Way AF Relaying

Figure 2:
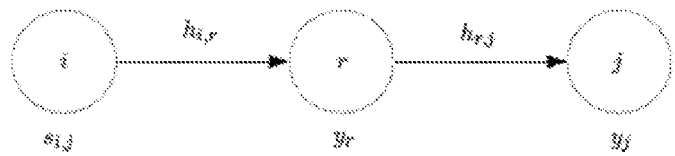
FIG. 2 depicts one-way amplify-and-forward relay communication through channels between nodes in the communication network.

This simple case depicted in FIG. 2 corresponds to the sequential application of one-way AF relaying to each MS-BS pair. It requires a total amount of 4N time slots to complete the information exchange among all pairs of nodes. The transmission from one node i (either MS or BS) to another node j (either BS or MS) can be represented by:

$$y_r = \sqrt{P_i} h_{i,r} s_{i,j} + n_r \quad \text{Eq. 2}$$

$$y_j = \beta_{r,j} h_{r,j} y_r + n_j \quad \text{Eq. 3}$$

in which $y_r$ represents a symbol received at the RS node r after a first time slot, $y_j$ represents a symbol received at node j after a following second time slot, $h_{i,r}$ represents the channel estimate for the channel between node i and the RS node r, $s_{i,j}$ represents a symbol sent from node i intended for node j, n represents the noise at a node, $\beta_{r,j}$ represents a positive real scalar that depends on the RS power constraint, and $h_{r,j}$ represents the channel estimate for the channel between the RS node r and the node j.

As noted above, reverse-direction communication for the user i requires two more time slots.

The RS has to forward the received symbol $y_r$ while satisfying its transmit power constraint, which is to say that $E\{|\beta_{r,j} y_r|^2\} = P_r$. Assuming that the symbols and the noise are independent random variables and that $E\{|s|^2\} = \sigma_s^2 = 1$, it follows that:

$$\beta_{r,j} = \sqrt{\frac{P_r}{P_u |h_{i,r}|^2 + \sigma_r^2}} \quad \text{Eq. 4}$$

The signal received in node j can be expanded as follows:

$$y_j = \sqrt{P_i} \beta_{r,j} h_{r,j} h_{i,r} s_{i,j} + \beta_{r,j} h_{r,j} n_r + n_j \quad \text{Eq. 5}$$

from which the SNR $\gamma_{i,j}$ can be written as follows:

$$\gamma_j = \frac{P_i \beta_{r,j}^2 |h_{i,r} h_{r,j}|^2}{\beta_{r,j}^2 |h_{r,j}|^2 \sigma_r^2 + \sigma_j^2} \quad \text{Eq. 6}$$

The sum rate of this relaying technique, applying Eq. 1, is given by the following:

$$C_{1W} = \frac{1}{4N} \sum_{i=1}^{N} \{\log_2(1+\gamma_{i,b}) + \log_2(1+\gamma_{b,i})\} \quad \text{Eq. 7}$$

with the SNR $\gamma$ given by Eq. 6, replacing the corresponding indexes.

Two-Way AF Relaying

Two-way AF relaying divides a transmission into two phases: a Multiple Access (MA) phase, in which a user and the base station transmit simultaneously to the RS, and a Broadcast (BC) phase, in which the RS transmits the combined signal to both the user (MS) and BS. When this procedure is sequentially applied to all users, a total of 2N time slots are required, which is half the resources required by one-way AF relaying.

Two-way AF relaying is a superposition-based AF scheme that is also called Bi-Directional Amplification of Throughput (BAT) relaying and is described in the above-cited publication by Popovski et al. When the RS transmits the combined symbols, each receiving node should be capable of subtracting its own interference. This is similar to the DF scheme employing network coding described in the above-cited publication by Larsson et al., but instead of combining decoded packets, the actual symbols are superimposed.

Figure 3:
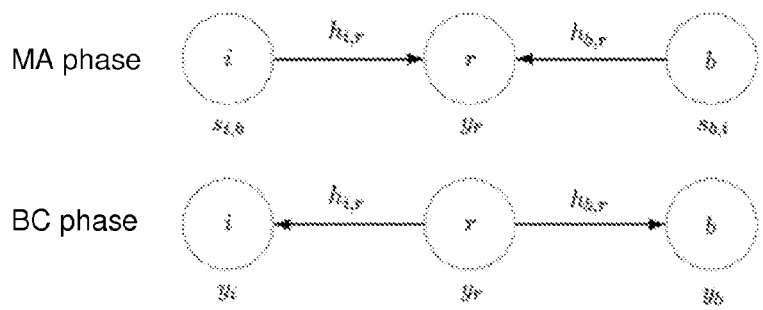
FIG. 3 depicts two-way amplify-and-forward relay communication.

FIG. 3 schematically depicts two-way AF relaying between a user i and a base station b through the relay station r. In the MA phase, a wireless signal transmitted by the user i during a first time period, or slot, typically includes one or more information symbols $s_{i,b}$ intended for the BS b. The wireless signal transmitted by the user i is modified by passage through a communication channel to the relay station r according to the channel's impulse response $h_{i,r}$. During the same time slot, the relay station r receives a wireless signal from the BS b that typically includes one or more information symbols $s_{b,i}$ intended for the user i. The wireless signal transmitted by the BS b is modified by passage through another communication channel to the relay station r according to the channel's impulse response $h_{b,r}$. Both transmitted signals are superposed on arrival at the RS r. In the BC phase in a succeeding time slot, the RS r transmits a signal that can be denoted $y_r$ to the user i and the BS b, and that signal is modified by passage through respective communication channels to the user i and BS b according to the channels' respective impulse responses $h_{i,r}$, $h_{b,r}$. As depicted in FIG. 3, the signal received at the user i can be denoted $y_i$, and the signal received at the BS b can be denoted $y_b$.

The system equations for the MA and BC phases of a given user i in two-way AF relaying are as follows:

$$MA: y_r = \sqrt{P_u} h_{i,r} s_{i,b} + \sqrt{P_b} h_{b,r} s_{b,i} + n_r \quad \text{Eq. 8}$$

$$BC: \begin{cases} y_i = \beta_r h_{i,r} y_r + n_i \\ y_b = \beta_r h_{b,r} y_r + n_b \end{cases} \quad \text{Eq. 9}$$

in which $y_r$ represents a symbol received at the RS node in one time slot, $h_{i,r}$ represents the channel estimate for the channel between an MS node i and the RS node, $s_{i,b}$ represents a symbol sent from MS node i intended for the BS node b, $h_{b,r}$ represents the channel estimate for the channel between the BS node b and the RS node, $s_{b,i}$ represents a symbol sent from BS node b intended for the MS node i, n represents the noise at a node, $\beta_r$ represents a positive real scalar that depends on the RS power constraint, $y_i$ represents a symbol received at the MS node i in the following time slot, and $y_b$ represents a symbol received at the BS node b in the following time slot.

For the BC phase, the RS, which does not have unlimited transmitter power, needs to constrain the transmit power of the combined symbols, such that $E\{|\beta_r y_r|^2\} = P_r$, which leads to the following expression for the RS gain factor $\beta_r$:

$$\beta_r = \sqrt{\frac{P_r}{P_u |h_{i,r}|^2 + P_b |h_{b,r}|^2 + \sigma_r^2}} \quad \text{Eq. 10}$$

Expansion of the expression for the signal received at the user (the top half of Eq. 9) yields the following:

$$y_i = \sqrt{P_u} \beta_r h_{i,r}^2 s_{i,b} + \sqrt{P_b} \beta_r h_{i,r} h_{b,r} s_{b,i} + \beta_r h_{i,r} n_r + n_i \quad \text{Eq. 11}$$

in which the first summand corresponds to the user's auto-interference, which should be removed at the user, the second summand represents the actual signal intended for the user, and the third and fourth summands are just noise.

In order to cancel the auto-interference, the user can perform the following operation:

$$\hat{y}_i = y_i - \sqrt{P_u} \hat{\beta}_r h_{i,r}^2 s_{i,b} \quad \text{Eq. 12}$$

in which $\hat{y}_i$ represents an estimate of the symbol $s_{b,i}$, and $\hat{\beta}_r$ represents an estimate of the RS gain factor. It will be noted that the only parameter that is not readily available at the user is the RS gain factor $\beta_r$, and so the user must therefore generate the $\hat{\beta}_r$ estimate, e.g., based on a previously signaled message having that value from the RS to all users.

The SNR of the equivalent transmission from the BS to the MS can then be written as follows:

$$\gamma_{b,i} = \frac{P_b \beta_r^2 |h_{i,r} h_{b,r}|^2}{P_u (\beta_r - \hat{\beta}_r)^2 |h_{i,r}|^2 \sigma_r^2 + \beta_r^2 |h_{i,r}|^2 \sigma_r^2 + \sigma_i^2} \quad \text{Eq. 13}$$

and the other SNR of the equivalent transmission from the MS to the BS can be written analogously as follows:

$$\gamma_{i,b} = \frac{P_u \beta_r^2 |h_{i,r} h_{b,r}|^2}{P_b (\beta_r - \hat{\beta}_r)^2 |h_{b,r}|^2 \sigma_r^2 + \beta_r^2 |h_{b,r}|^2 \sigma_r^2 + \sigma_b^2} \quad \text{Eq. 14}$$

The sum rate is thus given by the following:

$$C_{2W} = \frac{1}{2N} \sum_{i=1}^{N} \{\log_2(1+\gamma_{i,b}) + \log_2(1+\gamma_{b,i})\} \quad \text{Eq. 15}$$

Two-Way AF Relaying with 2-Antenna RS

This technique is similar to single-antenna two-way AF relaying in that the communication between each MS-BS pair takes two time slots, the pairs are processed sequentially, and there are MA and BC phases. Nevertheless, there are two main differences: the RS has two antennas, and the RS performs both receive and transmit processing to spatially cancel the interference between the concurrent data symbols. Previous analyses of this scheme, such as that described in the above-cited publication by Unger et al., are similar to the following analysis.

Let $H_i \in \mathbb{C}^{2 \times 2}$ be a two-by-two matrix of channel estimates, in which the rows represent the RS antenna elements and the columns represent a user i (an MS) and the BS. Also let $D \in \mathbb{C}^{2 \times 2}$ be a two-by-two matrix that represents receive processing in the RS during the MA phase, and let $M \in \mathbb{C}^{2 \times 2}$ be a two-by-two matrix that represents transmit processing in the RS during the BC phase. The matrix form analogous to Eqs. 8 and 9 is the following:

$$MA: y_r = DH_i s_i + Dn_r \qquad \text{Eq. 16}$$

$$BC: y = \beta_r H_i^T M y_r + n \qquad \text{Eq. 17}$$

with $$s_i = \begin{bmatrix} \sqrt{P_u} s_{i,b} \\ \sqrt{P_b} s_{b,i} \end{bmatrix}; y = \begin{bmatrix} y_i \\ y_b \end{bmatrix}; n = \begin{bmatrix} n_i \\ n_b \end{bmatrix} \qquad \text{Eq. 18}$$

and $y_r$ and $n_r$ representing the received signal vector and noise vector at the RS, respectively. It will be noted that in the BC phase, the channel matrix $H_i$ needs to be transposed in order to maintain coherence regarding the association of the channels and nodes.

Consider a Zero Forcing (ZF) approach, in which the interference among the symbols is totally canceled. In the MA phase, the solution for the receive processing matrix D at the RS is simply the inverse of the channel matrix, i.e., $D=H_i^{-1}$. For the BC phase, however, there are some additional aspects that need to be taken into account besides the matrix inversion. The transmit processing matrix must satisfy the RS power constraints, such that $E\{\|\beta_r M y_r\|^2\} = P_r$, which leads to the following expression for the RS gain factor $\beta_r$:

$$\beta_r = \sqrt{\frac{P_r}{tr(M^H M R_s) + tr(D^H M^H M D R_n)}} \qquad \text{Eq. 19}$$

in which $R_s = E\{s_i s_i^H\} = \text{diag}([P_u \, P_b])$ and $R_n = \sigma_r^2 I_2$. The other aspect is that the transmit processing matrix must include a permutation operator in order to avoid delivering to the nodes the same symbols they have sent. The transmit processing matrix M can thus be written as follows:

$$M = (H_i^T)^{-1} \prod_r, \quad \prod_r = \begin{bmatrix} 0 & 1 \\ 1 & 0 \end{bmatrix} \qquad \text{Eq. 20}$$

Substituting for the processing matrices in the system equations, the receive vectors become the following:

$$y_r = s_i + H_i^{-1} n_r \qquad \text{Eq. 21}$$

$$y = \beta_r \Pi_r s_i + \beta_r \Pi_r H_i^{-1} n_r + n \qquad \text{Eq. 22}$$

By letting $h_{i,1}$ and $h_{i,2}$ respectively denote the first and second rows of $H_i^{-1}$, the inverse of the channel matrix, the SNR of both nodes can be written as follows:

$$\gamma_{i,b} = \frac{P_u \beta_r^2}{\beta_r^2 tr(h_{i,1}^H h_{i,1} R_n) + \sigma_b^2} \text{ and } \gamma_{i,b} = \frac{P_b \beta_r^2}{\beta_r^2 tr(h_{i,2}^H h_{i,2} R_n) + \sigma_i^2} \qquad \text{Eq. 23}$$

which can be used to calculate the sum rate given by the following:

$$C_{2W,ZF} = \frac{1}{2N} \sum_{i=1}^{N} \{\log_2(1 + \gamma_{i,b}) + \log_2(1 + \gamma_{b,i})\} \qquad \text{Eq. 24}$$

Multi-Way AF (2N,N) Relaying with 2N-Antenna RS and N-Antenna BS

Instead of sequentially performing the relaying algorithms for each MS-BS pair, multi-way relaying reduces the number of required resources to only two time slots by considering the whole group of nodes as an equivalent MIMO system. On one side are the antenna elements of the RS and on the other side there is a group that includes the single-antenna MSs and the multi-antenna BS. In order to allow complete diagonalization, the BS must have as many antenna elements as there are MSs, so that there is one BS antenna for each MS signal. If there are N MSs, then the BS must have N antenna elements. The RS must be capable of receiving all of the MS and BS signals simultaneously in the MA phase, which requires the RS to have at least 2N antenna elements.

Let $H \in \mathbb{C}^{2N \times 2N}$ be a 2N-by-2N matrix of channel estimates, in which the rows represent the RS antenna elements and the columns represent a user i (an MS) and the BS. Also let $D \in \mathbb{C}^{2N \times 2N}$ be a 2N-by-2N matrix that represents receive processing in the RS during the MA phase, and let $M \in \mathbb{C}^{2N \times 2N}$ be a 2N-by-2N matrix that represents precoding (transmit) processing in the RS during the BC phase. The matrix form of the system equations analogous to Eqs. 8, 9 and 16, 17 is the following:

$$MA: y_r = DHs + Dn_r \qquad \text{Eq. 25}$$

$$BC: y = \beta_r H^T M y_r + n \qquad \text{Eq. 26}$$

with $$s = \begin{bmatrix} \sqrt{P_u} s_u \\ \sqrt{P_b/N} s_b \end{bmatrix}; s_u = \begin{bmatrix} s_{u1} \\ s_{u2} \\ \vdots \\ s_{uN} \end{bmatrix}; s_b = \begin{bmatrix} s_{b1} \\ s_{b2} \\ \vdots \\ s_{bN} \end{bmatrix} \qquad \text{Eq. 27}$$

$$y = \begin{bmatrix} y_u \\ y_b \end{bmatrix}; y_u = \begin{bmatrix} y_{u1} \\ y_{u2} \\ \vdots \\ y_{uN} \end{bmatrix}; y_b = \begin{bmatrix} y_{b1} \\ y_{b2} \\ \vdots \\ y_{bN} \end{bmatrix} \qquad \text{Eq. 28}$$

It will be noted that the system equations Eqs. 25, 26 are similar to those of two-way AF relaying as described above, following the same logic in a more general scenario. Nevertheless, there is a difference with regard to the power allocated to each signal. Each user (MS) is independent and has power $P_u$ available to allocate to its respective transmitted signal. The BS, on the other hand, has power $P_b$ in total, which must be divided among the signals it transmits to the users. As described in Eq. 27, equal BS power allocation can be assumed.

The receive and transmit processing matrices D, M of the RS, assuming a zero-forcing algorithm, are given by the following:

$$D = H^{-1} \qquad \text{Eq. 29}$$

$$M = (H^T)^{-1} \prod_r, \quad \prod_r = \begin{bmatrix} 0 & I_N \\ I_N & 0 \end{bmatrix} \qquad \text{Eq. 30}$$

The permutation matrix $\Pi_r$ has the effect of vertically swapping the MS and BS symbol vectors, such that bi-directional communication can be realized.

Regarding the RS power constraint, we also have that $E\{\|\beta_r M y_r\|^2\} = P_r$, which leads to the following expression for the RS gain factor $\beta_r$:

$$\beta_r = \sqrt{\frac{P_r}{tr(M^H M R_s) + tr(D^H M^H M D R_n)}} \qquad \text{Eq. 31}$$

which has the same form as Eq. 19, but with the D, M matrices given by Eqs. 29, 30 and with $R_s = E\{ss^H\} = \text{diag}([P_u I_N (P_b/N) I_N])$ and $R_n = \sigma_r^2 I_{2N}$ Substituting for the receive and transmit processing matrices (Eqs. 29, 30) in the system equations (Eqs. 25, 26) yields the following expressions for the receive vectors:

$$y_r = s + H^{-1} n_r \qquad \text{Eq. 32}$$

$$y = \beta_r \Pi_r s + \beta_r \Pi_r H^{-1} n_r + n \qquad \text{Eq. 33}$$

By letting $h_i$ denote the i-th row of the matrix $\Pi_r H^{-1}$, the SNR of a given pair of nodes can be written as follows:

$$\gamma_{i,b} = \frac{P_u \beta_r^2}{\beta_r^2 tr(h_{i+N}^H h_{i+N} R_n) + \sigma_b^2} \text{ and} \qquad \text{Eq. 34}$$

$$\gamma_{b,i} = \frac{(P_b/N)\beta_r^2}{\beta_r^2 tr(h_i^H h_i R_n) + \sigma_i^2}$$

which can be used to calculate the sum rate given by the following:

$$C_{MW,2N-N} = \frac{1}{2} \sum_{i=1}^{N} \{\log_2(1 + \gamma_{i,b}) + \log_2(1 + \gamma_{b,i})\} \qquad \text{Eq. 35}$$

Improved Multi-Way AF (N,N) Relaying with N Antennas at RS and BS

Previous approaches to multi-way relaying as described above can reduce the time resources required for bi-directional communication between multiple MSs and a BS, but only at a cost of requiring a large number of antennas, especially at the RS, which requires double the number of antennas of the BS. It is preferable that the RS be a low-cost version of a BS, and so the above-described previous relaying techniques cannot provide a low-cost RS for a practical communication network.

The inventors have recognized that it is possible to provide multi-way relaying with an RS having a number of antenna elements that is substantially the same as the number of antenna elements at the BS by using bi-directional throughput amplification (BAT) and superposition of signals, leaving to the MS and BS nodes the task of canceling their self-interference.

Two examples of improved relaying in accordance with this invention are described below: a ZF-based relaying algorithm that achieves the goal of reducing the required number of antenna elements at the RS, and a further improved version of the ZF-based relaying algorithm that is based on QR decomposition and successive interference cancellation. The artisan will understand that QR decomposition, or QR factorization, of a matrix is generally a decomposition of the matrix into an orthogonal matrix and an upper triangular matrix.

Improved Multi-Way ZF (N,N) Relaying

Let us assume that there are N single-antenna MSs, a single N-antenna RS, and a single N-antenna BS. This corresponds to a rectangular N×2N MIMO system, for which there are fewer degrees of freedom than the (2N,N) relaying described above, which corresponds to a 2N×2N MIMO system. In this improved technique, the BS also performs transmit and receive processing in order to aid the RS in the task of handling the interference.

The system equations for the MA and BC phases can be expressed as follows:

$$\text{MA:} \quad y_r = D^{(1)} H M^{(1)} s + D^{(1)} n_r \qquad \text{Eq. 36}$$

$$\text{BC:} \quad y = D^{(2)} H^T M^{(2)} y_r + D^{(2)} n \qquad \text{Eq. 37}$$

Substituting Eq. 36 into Eq. 37 yields the following:

$$y = D^{(2)} H^T M^{(2)} D^{(1)} H M^{(1)} s + D^{(2)} H^T M^{(2)} D^{(1)} n_r + D^{(2)} n \qquad \text{Eq. 38}$$

with $$s = \begin{bmatrix} s_u \\ s_b \end{bmatrix}; \quad s_u = \begin{bmatrix} s_{1,b} \\ s_{2,b} \\ \vdots \\ s_{N,B} \end{bmatrix}; \quad s_b = \begin{bmatrix} s_{b,1} \\ s_{b,2} \\ \vdots \\ s_{b,N} \end{bmatrix} \qquad \text{Eq. 39}$$

$$y = \begin{bmatrix} y_u \\ y_b \end{bmatrix}; \quad y_u = \begin{bmatrix} y_{u1} \\ y_{u2} \\ \vdots \\ y_{uN} \end{bmatrix}; \quad y_b = \begin{bmatrix} y_{b1} \\ y_{b2} \\ \vdots \\ y_{bN} \end{bmatrix} \qquad \text{Eq. 40}$$

The inventors have recognized that such spatial processing can result in a block matrix that combines all symbols in such a way that each node receives its own symbol and its intended symbol. That block matrix should contain N-dimensional diagonal blocks, such that:

$$D^{(2)} H^T M^{(2)} D^{(1)} H M^{(1)} = \begin{bmatrix} I_N & I_N \\ I_N & I_N \end{bmatrix} \qquad \text{Eq. 41}$$

which means that only partial interference cancellation occurs, with each receiver (MS or BS) subtracting its own self-interference.

A suitable block matrix can be obtained from the separate BC and MA phases as follows, considering that:

$$D^{(2)} H^T M^{(2)} = \begin{bmatrix} I_N \\ I_N \end{bmatrix}, \quad D^{(1)} H M^{(1)} = [I_N \quad I_N] \qquad \text{Eq. 42}$$

It will be noted that the identity matrices in Eqs. 41, 42 can in general be multiplied by real scalar values.

To begin, the MIMO transceiver matrices in the MA phase can be determined. The symbols transmitted by the MSs and by the BS are precoded by a matrix $M^{(1)} \in \mathbb{C}^{2N \times 2N}$, which is a 2N-by-2N matrix. Since the users are independent, the matrix $M^{(1)}$ must have the following block-diagonal structure:

$$M^{(1)} = \begin{bmatrix} \sqrt{P_u} I_N & 0 \\ 0 & \beta_b M_b \end{bmatrix} \qquad \text{Eq. 43}$$

in which $M_b \in \mathbb{C}^{2N \times 2N}$ is the precoding (transmit processing) matrix of the BS. It will be appreciated that, for a respective user MS, the first N rows of the total transmit processing (precoding) matrix $M^{(1)}$ indicate the amplification of a symbol by the MS's available transmit power. Each MS has a single antenna, and so there is not truly a precoding matrix $M_u$ for each MS; instead, each MS applies a real scalar gain $\sqrt{P_u}$ to the symbol. As the BS has N antennas, the BS can perform linear precoding on all N of its symbols, and so the transmit processing (precoding) matrix $M_b$ of the BS is an N×N matrix. As shown by Eq. 43, the total transmit processing matrix $M^{(1)}$ in slot 1 has a block diagonal structure. The upper-left block corresponds to an identity matrix scaled by the real scalar gain $\sqrt{P_u}$, where each element of the diagonal corresponds to the processing done at each user MS, which is merely amplify the signal. The lower-right block corresponds to the processing (precoding) done at the BS, which is a full matrix denoted $\beta_b M_b$.

The receive processing matrix at the RS, $D^{(1)} \in \mathbb{C}^{N \times N}$ matches the dimensions of $M_b$. The channel matrix $H \in \mathbb{C}^{N \times 2N}$ can also be written as $H=[H_u \; H_b]$, which contains the N×N channel matrices of the users ($H_u$) and of the BS ($H_b$). Expanding by substituting yields the following for the processing in the MA phase:

$$D^{(1)} H M^{(1)} = D^{(1)} [H_u \; H_b] \begin{bmatrix} \sqrt{P_u} I_n & 0 \\ 0 & \beta_b M_b \end{bmatrix} = \qquad \text{Eq. 44}$$

$$[\sqrt{P_u} D^{(1)} H_u \; \beta_b D^{(1)} H_b M_b]$$

To obtain an equation of the form of Eq. 42, the matrix $D^{(1)}$ in Eq. 44 is defined as $D^{(1)} = H_u^{-1}$, and looking at the right-hand block in Eq. 44, it follows that $M_b = (D^{(1)} H_b)^{-1} = H_b^{-1} H_u$. Finally, the scale factor $\beta_b$ can be determined from the transmit energy constraint at the BS, i.e., $E\{\|\beta_b M_b s_b\|^2\} = P_b$, with $s_b$ given by Eq. 39. The transceiver matrices of the MA phase can thus be summarized as follows:

$$D^{(1)} = H_u^{-1} \qquad \text{Eq. 45}$$

$$M^{(1)} = \begin{bmatrix} \sqrt{P_u} I_N & 0 \\ 0 & \beta_b H_b^{-1} H_u \end{bmatrix}, \qquad \text{Eq. 46}$$

$$\beta_b = \sqrt{\frac{P_b}{tr(H_u^H H_b^{-1,H} H_u R_{sb})}}$$

with $R_{sb} = E\{s_b s_b^H\} = I_N$.

A corresponding analysis can be done for the BC phase. The symbols transmitted by the RS are precoded by a transmit processing matrix $M^{(2)} \in \mathbb{C}^{N \times N}$, which is a full matrix given by $M^{(2)} = \beta_r M_r$. The receive processing matrix $D^{(2)} \in \mathbb{C}^{2N \times 2N}$, which encompasses the processing done at the users and the BS, must have a block-diagonal structure as follows:

$$D^{(2)} = \begin{bmatrix} I_N & 0 \\ 0 & D_b \end{bmatrix} \qquad \text{Eq. 47}$$

where $D_b \in \mathbb{C}^{N \times N}$ is the receive processing matrix of the BS. Expanding by substituting yields the following for the processing in the BC phase:

$$D^{(2)} H^T M^{(2)} = \begin{bmatrix} I_N & 0 \\ 0 & D_b \end{bmatrix} \begin{bmatrix} H_u^T \\ H_b^T \end{bmatrix} \beta_r M_r = \begin{bmatrix} \beta_r H_u^T M_r \\ \beta_r D_b H_b^T M_r \end{bmatrix} \qquad \text{Eq. 48}$$

From Eqs. 42, 48, it follows that $M_r = H_u^{-1,T}$ and that $D_b = (H_b^T M_r)^{-1} = H_u^T H_b^{-1,t}$. In addition, the RS gain factor $\beta_r$ can be adjusted to stay within the RS transmit power constraint, i.e., $E\{\|\beta_r M_r y_r\|^2\} = P_r$. The solution of the transceiver matrices of the BC phase is then given by the following:

$$D^{(2)} = \begin{bmatrix} I_N & 0 \\ 0 & H_u^T H_b^{-1,t} \end{bmatrix} \qquad \text{Eq. 49}$$

$$M^{(2)} = \beta_r H_u^{-1,T}, \; \beta_r = \sqrt{\frac{P_r}{tr(M^{(1),H} H^H \overline{H_u} H M^{(1)} R_s) + tr(\overline{H_u} R_n)}} \qquad \text{Eq. 50}$$

in which $\overline{H_u} = H_u^{-1,H} H_u^{-1,*} H_u^{-1,T} H_u^{-1}$, the matrix $M^{(1)}$ is given by Eq. 46, $R_s = I_{2N}$, and $R_n = E\{n_r n_r^H\} = \sigma_r^2 I_N$. It will be noted that the $R_s$ in Eq. 50 is slightly different from the $R_s$ in Eq. 31 because now the energy constraining aspects of the MA phase are assumed to be totally within the matrix $M^{(1)}$, leaving the elements of the symbol vector with unit variance.

With the transceiver filters (i.e., transmit and receive processing matrices) in hand, the received symbol vector after the BC phase can be expanded by substituting Eqs. 45, 46, 49, and 50 into Eq. 38, which yields the following:

$$y = \beta_r \begin{bmatrix} \sqrt{P_u} I_N & \beta_b I_N \\ \sqrt{P_u} I_N & \beta_b I_N \end{bmatrix} s + \beta_r \begin{bmatrix} H_u^{-1} \\ H_u^{-1} \end{bmatrix} n_r + \begin{bmatrix} n_u \\ H_u^T H_b^{-1,T} n_b \end{bmatrix} \qquad \text{Eq. 51}$$

It will be appreciated that Eq. 51 is exactly what was intended to be achieved in Eq. 41, with blocks of identity matrices, scaled by real values, pre-multiplying the symbol vector.

Let $h_{u,i}$ denote the i-th row of the matrix $H_u^{-1}$ and $h_{ub,i}$ denote the i-th row of matrix $H_u^T H_b^{-1,T}$. The i-th symbols received by a given MS i and the BS can be expressed as follows:

$$y_{ui} = \beta_r (\sqrt{P_u} s_{ui} + \beta_b s_{bi}) + \beta_r h_{u,i} n_r + n_{ui} \qquad \text{Eq. 52}$$

$$y_{bi} = \beta_r (\sqrt{P_u} s_{ui} + \beta_b s_{bi}) + \beta_r h_{u,i} n_r + h_{ub,i} n_b \qquad \text{Eq. 53}$$

It will be noted that there is a self-interference term in each received signal (Eq. 52 for the user i and Eq. 53 for the i-th symbol of the base station) that can be removed by each receiver as it is readily available to each receiver. The value that neither an MS nor a BS has readily available is the relay station gain factor $\beta_r$, which therefore can be provided to the MSs and BSs through a suitable configuration message, such as a Radio Resource Control (RRC) message or a lower (or higher) layer message.

It will be appreciated that for an MS to estimate the gain factor $\beta_r$ precisely, the MS needs to know both the $H_u$ and $H_b$ channel matrices, as well as the power constraints $P_b$ and $P_r$.

Thus, less signaling overhead is needed to signal the gain factor than to signal those parameters to the MSs. An alternative to signaling the gain factor to an MS can be generating in the MS an estimate of the gain factor $\beta_r$ by averaging received signal values. The BS, which has been assumed to know both $H_u$ and $H_b$ and certainly knows at least its power constraint, can generate a good estimate of $\beta_r$ without needing the signaling overhead.

After the receivers carry out self-interference cancellation, Eqs. 52, 53 can be rewritten respectively as follows:

$$y_{ui} = (\beta_r - \hat{\beta}_r)\sqrt{P_u} s_{ui} + \beta_r \beta_b s_{bi} + \beta_r h_{ui} n_r + n_{ui} \qquad \text{Eq. 54}$$

$$y_{bi} = \beta_r \sqrt{P_u} s_{ui} + (\beta_r - \hat{\beta}_r)\beta_b s_{bi} + \beta_r h_{ui} n_r + h_{ubi} n_b \qquad \text{Eq. 55}$$

It will be noted that Eq. 54 refers to the i-th MS. In a form of Eq. 54 that omits the index i, the vector $h_u$ corresponds to the i-th row of matrix $H_u^{-1}$, representing the respective row of the inverse communication channel between the MS and the RS.

The SNRs at each node can be written as follows:

$$\gamma_{ui} = \frac{\beta_r^2 \beta_b^2}{(\beta_r - \widehat{\beta_r})^2 P_u + \beta_r^2 tr(h_{ui}^H h_{ui} R_{nr}) + \sigma_u^2} \qquad \text{Eq. 56}$$

$$\gamma_{bi} = \frac{P_u \beta_r^2}{(\beta_r - \widehat{\beta_r})^2 \beta_b^2 + \beta_r^2 tr(h_{ui}^H h_{ui} R_{nr}) + tr(h_{ubi}^H h_{ubi} R_{nb})} \qquad \text{Eq. 57}$$

with $R_n = \sigma_r^2 I_N$ and $R_{nb} = \sigma_b^2 I_N$. Finally, the sum rate is given by the following:

$$C_{MW,N-N} = \frac{1}{2}\sum_{i=1}^{N}\{\log_2(1+\gamma_{ui}) + \log_2(1+\gamma_{bi})\} \qquad \text{Eq. 58}$$

To conclude the description of this method, it is important to be aware of two restrictions to which it is subjected. First, as it is the case in the two-way single-antenna AF relaying, estimates of the real scalar value r should be available at the MSs and BS. The other restriction is that, as it can be seen from (46) and (49), the BS requires knowledge of the channel between RS and MSs in order to be able to aid in the interference cancellation process.

Multi-Way ZF (N, N) Relaying with QR-Based Processing

The MW-ZF algorithm presented in the previous section assumes that all interference is canceled, except the self-interference of each node. Nevertheless, from the multi-antenna BS point-of-view, for each signal it wishes to receive from a user it is actually not necessary to spend energy in canceling BS signals, since they can all be considered as self-interference. From this reasoning, the constraints imposed by the MW-ZF algorithm can be relaxed in order to make the transmission more efficient.

Ideally, the result of the spatial processing would be a block matrix such as $$D^{(2)} H^T M^{(2)} D^{(1)} H M^{(1)} = \begin{bmatrix} I_N & I_N \\ I_N & F \end{bmatrix} \qquad \text{Eq. 59}$$

where F represents a full matrix. In comparison to Eq. 41, there is one block fewer to diagonalize, which would be advantageous. Nevertheless, it can be shown that such a matrix structure is impossible to achieve for decoupled RS and BS processing.

The inventors have recognized that the constraints in Eq. 59 can be modified by considering two triangular matrices instead of a full matrix. When substituting Eqs. 44 and 48 into the left-hand side of Eq. 59, and changing the right-hand side of Eq. 59 to the triangular constraints, the following is obtained:

$$\begin{bmatrix} \sqrt{P_u}\beta_r H_u^T M_r D_r H_u & \beta_b \beta_r H_u^T M_r D_r H_b M_b \\ \sqrt{P_u}\beta_r D_b H_b^T M_r D_r H_u & \beta_b \beta_r D_b H_b^T M_r D_r H_b M_b \end{bmatrix} = \begin{bmatrix} I_N & I_N \\ T & T \end{bmatrix} \qquad \text{Eq. 60}$$

in which T is an upper triangular matrix. It will be noted that $D^{(1)}$ is written as $D_r$ in Eq. 60 in order to simplify the notation. In terms of nulling constraints, it will be noted that Eq. 60 has $3(N^2-N)$ zero-forced entries, and thus should be equivalently energy efficient as the case in Eq. 59 with the advantage that Eq. 60 is actually feasible.

For example, the system equation of the received symbol vector at the BS for N=3 antennas and MSs is given by the following:

$$y_b = [T \; T] \begin{bmatrix} s_u \\ s_b \end{bmatrix} + \check{n} = \begin{bmatrix} x & x & x & x & x & x \\ 0 & x & x & 0 & x & x \\ 0 & 0 & x & 0 & 0 & x \end{bmatrix} \begin{bmatrix} s_{u,1} \\ s_{u,2} \\ s_{u,3} \\ s_{b,1} \\ s_{b,2} \\ s_{b,3} \end{bmatrix} + \check{n} \qquad \text{Eq. 61}$$

in which the scalar gains have been left out, ň denotes the combined noise at the RS and BS, and x indicates a value of the sought-for upper triangular matrix T. The BS can implement self-interference cancellation successively from the bottom to the top in Eq. 61 as follows. Beginning from the last row, since the BS knows its own $s_{b,3}$, it can decode $s_{u,3}$. Going up one row, since the BS knows its own $s_{b,2}$ and $s_{b,3}$, as well as $s_{u,3}$ from decoding the last row, it can decode $s_{u,2}$. Proceeding successively to the top, all user symbols can be decoded, thus demonstrating the feasibility of the triangular structure in Eqs. 60, 61. Next, how to obtain the triangular matrices is described.

With the following:

$$D_r = H_u^{-1}, \; M_r = H_u^{T,-1}, \; M_b = H_b^{-1} H_u \qquad \text{Eq. 62}$$

it is up to the BS receive processing matrix $D_b$ to perform the triangularization, and we have $D_b H_b^T M_r D_r H_u = D_b H_b^T H_u^{T,-1} = T$.

The inventors have recognized that QR decomposition can be used by defining:

$$QR = H_b^T H_u^{T,-1} \qquad \text{Eq. 63}$$

in which Q is an orthogonal matrix and R is an upper triangular matrix, and defining T=ΛR, in which $\Lambda = \text{diag}(R_{1,1}, R_{2,2}, \ldots, R_{N,N})^{-1}$, such that T is an upper triangular matrix with ones in the main diagonal. By setting $D_b = \Lambda Q^{-1}$, only the triangular matrix T remains, which is what is desired.

By substituting $D_b = \Lambda Q^{-1}$ into Eq. 47, and then substituting the newly obtained $D^{(2)}$ along with Eqs. 45, 46, and 50 into Eq. 38, the complete equation of the combined received signal vector is the following:

$$y = \beta_r \begin{bmatrix} \sqrt{P_u}\,I_N & \beta_b I_N \\ \sqrt{P_u}\,T & \beta_b T \end{bmatrix} s + \beta_r \begin{bmatrix} H_u^{-1} \\ TH_u^{-1} \end{bmatrix} n_r + \begin{bmatrix} n_u \\ \Lambda Q^{-1} n_b \end{bmatrix} \quad \text{Eq. 64}$$

with $\beta_b$ and $\beta_r$ given by Eqs. 46 and 50, respectively.

Let $t_{i,j}$ denote an element of matrix T in the i-th row and j-th column, $h_{u,i}$ denote the i-th row of matrix $H_u^{-1}$, $h_{tu,i}$ denote the i-th row of matrix $TH_u^{-1}$, and $q_i$ denote the i-th row of matrix $\Lambda Q^{-1}$. The symbols received by the users follow the same equation as Eq. 52, with the self-interference cancellation proceeding as in Eq. 54 and the SINR given by Eq. 56. At the BS, however, due to the different receive processing, the corresponding above-listed equations are somewhat modified.

Recognizing that $t_{i,j}=0$, $\forall j<i$, the i-th signal received at the BS can be written as follows:

$$y_{bi} = \beta_r \sum_{j=i}^{N} \left( \sqrt{P_u}\, t_{i,j} s_{uj} + \beta_b t_{i,j} s_{bi} \right) + \beta_r h_{tu,i} n_r + q_i n_b \quad \text{Eq. 65}$$

and the base station can subtract the whole interference according to the following:

$$y_{bi} = \beta_r \sqrt{P_u}\, s_{ui} + \beta_r \sum_{j=i+1}^{N} \sqrt{P_u}\, t_{i,j}(\beta_r s_{uj} - \widehat{\beta_r}\, \widehat{s_{uj}}) + \quad \text{Eq. 66}$$

$$\sum_{j=i}^{N} \beta_b t_{i,j} s_{bi}(\beta_r - \widehat{\beta_r}) + \beta_r h_{tu,i} n_r + q_i n_b$$

The first summation in Eq. 66 corresponds to the subtraction of the previously estimated user symbols (i.e., successive interference cancellation), and the second summation corresponds to the cancellation of the BS's own symbols (i.e., self-interference cancellation).

The SNR at the BS is given by the following:

$$\gamma_{bi} = \frac{P_u \beta_r^2}{\sum_{j=i+1}^{N} P_u |t_{i,j}|^2 (\beta_r - \widehat{\beta_r})^2 + \sum_{j=i}^{N} \beta_b^2 |t_{i,j}|^2 (\beta_r - \widehat{\beta_r})^2 +} \quad \text{Eq. 67}$$
$$\beta_r^2 tr(h_{tu,i}^H h_{tu,i} R_{nr}) + tr(q_i^H q_i R_{nb})$$

with $R_{nr}=\sigma_r^2 I_N$ and $R_{nb}=\sigma_b^2 I_N$. It can be noted that the SNR expression Eq. 67 assumes that the estimated user symbols have the same variance as the actual symbols, for which a unitary value has been considered throughout this application. As for the sum rate, it is given by Eq. 58, using Eq. 56 and Eq. 67.

This method is subject to the same restrictions as the previous algorithm, i.e., estimates of the real scalar value $\beta_r$ should be available at the MSs and BS, with the BS also requiring knowledge of the channels between the RS and the MSs in order to perform the receive processing. An additional aspect is that, due to the successive interference cancellation at the BS, this method can be more sensitive to error propagation when user symbols are not adequately estimated at the BS.

Simulations and Results

The performance of the improved relaying algorithms described above has been simulated, and simulation results are described below. A simple network was assumed, having a single cell containing N single-antenna MSs, a single multi-antenna-capable RS, and a single multi-antenna-capable BS. A Monte-Carlo simulation was conducted, with roughly 50,000 channel realizations. At each realization, the signal to interference ratio (SINR) of all nodes and the resulting sum rate were calculated and stored. At the end, the sum rate was averaged over all realizations to produce a mean value for a given scenario/algorithm.

It was assumed that the users were at roughly the same distance from the RS, and the distance between the RS and BS was varied. In order to have a fair comparison, we assume that a $\sigma_u^2=\sigma_r^2=\sigma_b^2=1$ and that $P_u=P_r=P_b=1$. Given these parameters, the average link SNR depends mainly on the distance. Expressing this average link SNR in logarithmic scale, it was considered that the SNR of the MS-RS links was fixed at 10 dB, and the SNR between the RS and BS varied from 0 to 40 dB. Additionally, for algorithms that depend on self-interference cancellation, it was assumed that the RS gain factor $\beta_r$ was perfectly estimated at the MSs and BS. The same applied to successive interference cancellation, i.e., it was assumed that the successive symbol estimation proceeded without errors.

Figure 4:
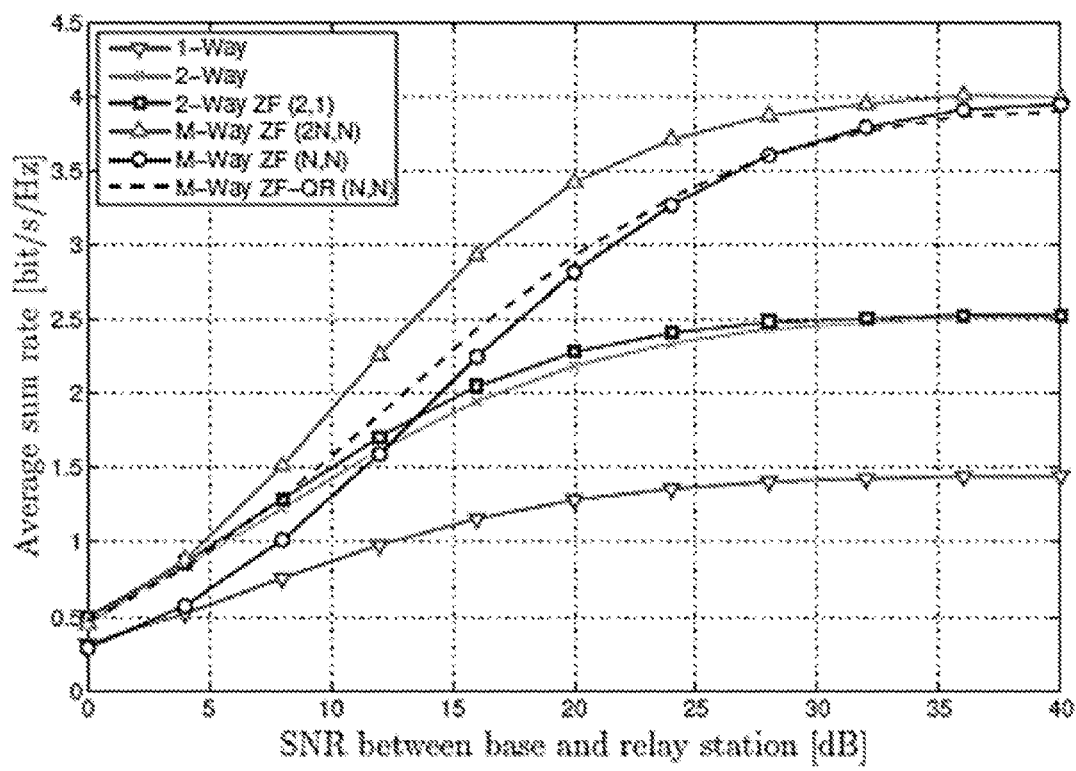
FIGS. 4, 5, and 6 are plots of sum rate with respect to signal to noise ratio for simulations of different relaying algorithms and different numbers of users.
Figure 5:
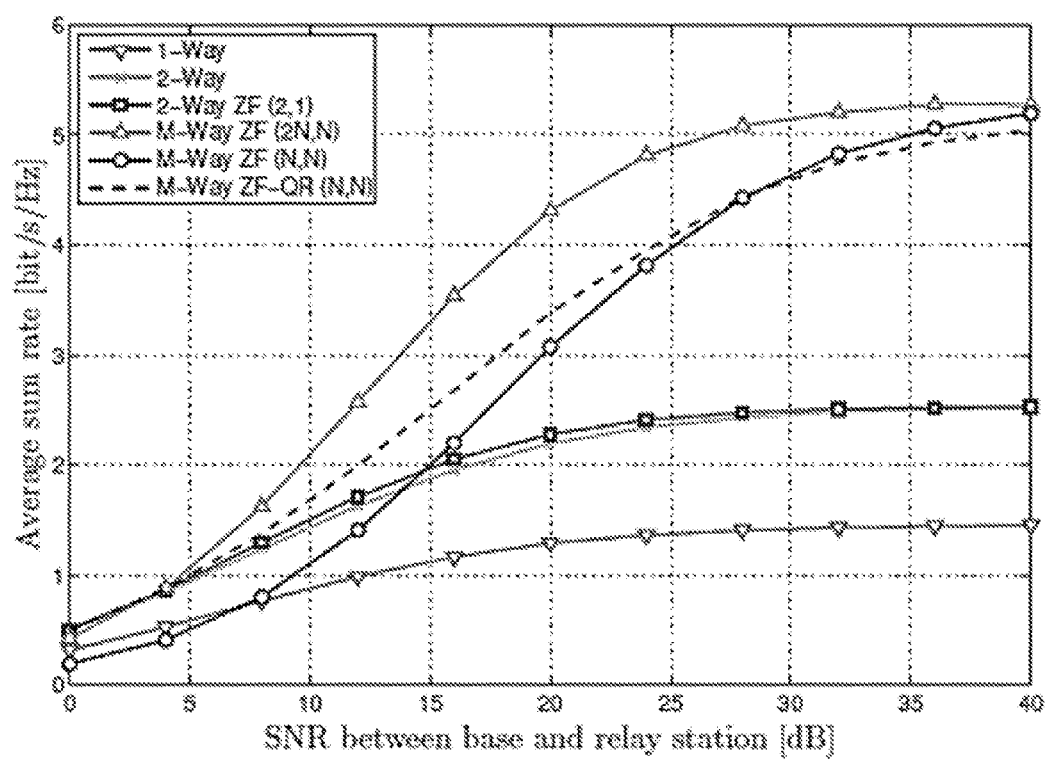
Figure 6:
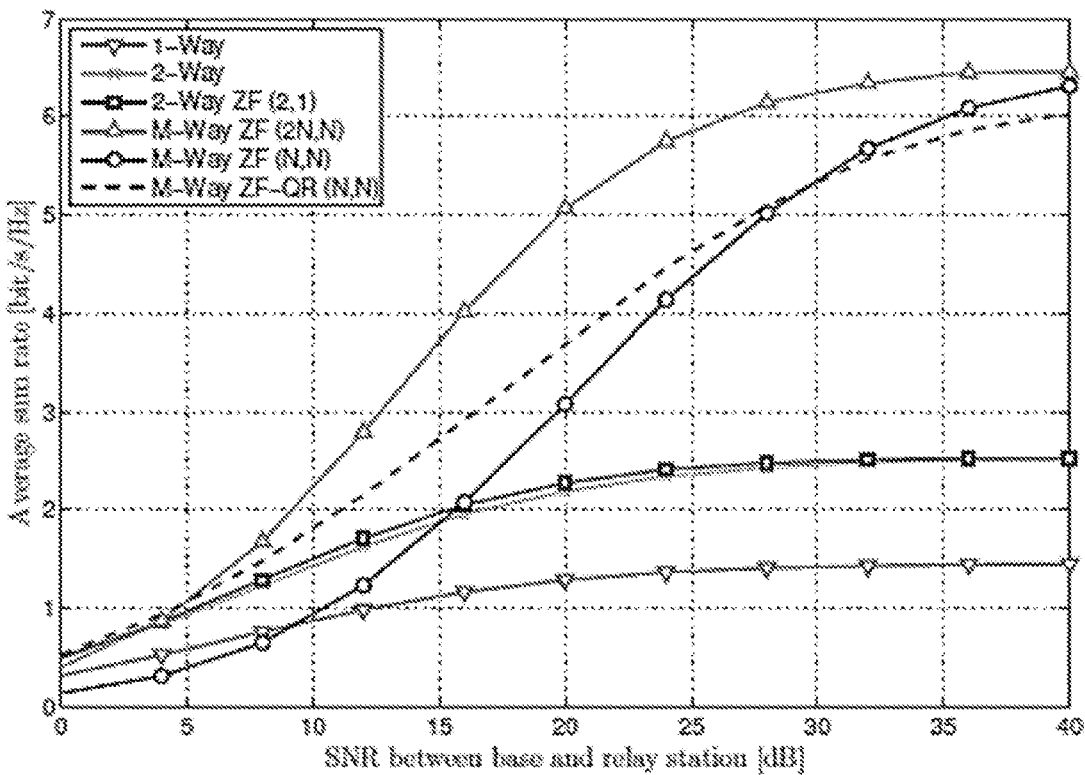

FIGS. 4, 5, and 6 depict the simulated average sum rate C in bits/second/Hertz with respect to RS-BS SNR of the algorithms described above (i.e., Eqs. 7, 15, 24, 35, and 58) for 2, 3, and 4 users (MSs), respectively. In the legend in each figure, the values in parentheses indicate the number of antennas at the RS and BS, in that order.

It can be seen from FIGS. 4, 5, and 6 that the performances of the 1-way and 2-way AF relaying with self-cancellation algorithms do not vary with on the number of users because those algorithms are performed sequentially for each user, and the number of users appears in the denominator of their sum rate equations. It can also be seen that the 2-way AF relaying algorithm presents a significant increase in performance over the 1-way AF relaying algorithm.

The 2-way ZF relaying algorithm with 2 antennas at the RS and 1 antenna at the BS (2-Way ZF (2,1)) is only slightly better than 2-way AF relaying with self-interference cancellation. Thus, the latter can be better from a cost/performance trade-off point of view because it would have a lower cost in terms of computational power and hardware equipment for roughly the same performance.

The multi-way (M-Way) ZF relaying algorithms have better sum rate performances than the 1- and 2-way algorithms for moderate to high SNR values. The performance gains come from the increased numbers of antennas at the BS and RS. The multi-way algorithm with (2N,N) antennas reaches, as expected, the highest sum rates, but the performances of both improved multi-way (N,N) algorithms described above are not much lower, and the performances of all three even converge for high SNRs. The improved multi-way ZF QR-based algorithm, in particular, also matches the performance of the multi-way algorithm with (2N,N) antennas for low SNR values. This shows that a relay station can have half the usual number of antennas and still have generally good performance.

Comparing the performances of the two improved multi-way (N,N) algorithms, it can be seen that the QR-based algorithm has better performance at low to moderate SNRs in comparison to the other algorithm, and the performance improvement is higher for larger numbers of users. The QR-based algorithm can thus present a good performance/complexity trade-off as it incurs a cost of only a slightly more complex receive processing at the BS, i.e., a QR decomposition instead of a matrix inversion. It can also be noted that increasing the number of users from 2 (FIG. 4) to 4 (FIG. 6) in the simulations resulted in sum rate increases for both improved multi-way relaying algorithms due to the increased traffic load that circulated for the same amount of resources.

The artisan will appreciate that methods and apparatus implementing the improved multi-way relaying algorithms described above enjoy many advantages over implementations of previous algorithms. For example, only half the number of antennas are needed compared to previous relaying algorithms while still performing multi-way relay in two time resources. In addition, the improved algorithms achieve almost the same performance for high and low SNRs as the previous algorithm needing twice as many antennas at the relay station. The improved relaying algorithms also enable more reasonable performance/complexity trade-offs to be made.

The artisan will understand that the methods and apparatus described in this application can be implemented in many types of electronic communication networks, such as mobile radio telephone networks.

Figure 7A:
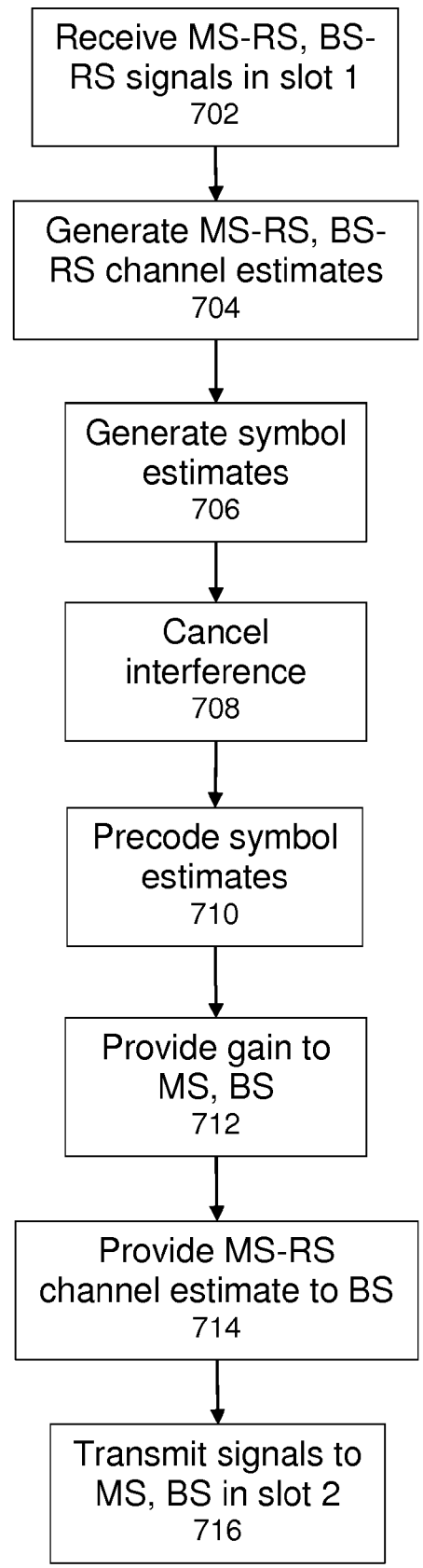

FIG. 7A is a flow chart of a method of relaying respective first wireless signals from a plurality of mobile stations to a base station and a second wireless signal from the base station to the mobile stations employing an improved relaying algorithm as described above. The method can be implemented in a relay station in the base station's cell, for example. In the following descriptions of FIGS. 7A, 7B, 7C, the steps are linked to corresponding equations for the convenience of the reader.

In step 702, the first and second wireless signals are received at the relay station through at least two antennas during a first time slot of two successive time slots. Each of the first wireless signals includes a respective symbol and the second wireless signal includes a plurality of symbols.

The relay station generates a first relay signal based on estimates of the symbols of the first wireless signals and a second relay signal based on estimates of the plurality of symbols of the second wireless signal by the following steps.

In step 704, the relay station generates respective channel estimates for the communication channels between the relay station and the mobile and base stations. In step 706, the relay station generates respective estimates of the symbols in the first and second wireless signals received during the first time slot by applying its receive processing matrix to its received wireless signals. Generating the symbol estimates includes canceling (step 708; see Eq. 45) interference between symbols based on the respective channel estimates. In step 710, the relay station suitably precodes the symbol estimates according to its transmit processing matrix (see Eq. 50), including amplifying the estimates by a predetermined gain factor that it provides either once or from time to time (step 712) at least to the MSs, and optionally to the BS. The relay station also provides (step 714) to the base station the respective channel estimates of the mobile station-relay station communication channels that the base station can use in its receive signal processing.

In step 716, the relay station transmits the first and second relay signals through the at least two antennas during a second time slot of the two successive time slots.

FIG. 7B is a flow chart of an improved method of amplify-and-forward relay communication in a base station having a relay station in the base station's cell as described above. In step 722, the base station receives respective channel estimates for communication channels between the relay station and a plurality of mobile stations in the cell, and optionally receives an indication of the signal gain factor of the relay station. In step 724, the base station generates precoded symbols for the respective mobile stations that the base station intends to include in a wireless signal that the base station will transmit into the cell in a first time slot. Step 724 relates to the lower right block of matrix $M^{(1)}$ in Eq. 46, which is a more complete expression than Eq. 43. In step 726, the base station transmits the wireless signal including the plurality of symbols into the cell, and thus to the relay station, in the first time slot. In step 728, the base station receives, in a second time slot that succeeds the first time slot, a relay signal transmitted by the relay station that is based on estimates by the relay station of a respective symbol transmitted by each mobile station in the first time slot. In step 730, the base station cancels interference and self-interference between symbols in the received relay signal based on the respective channel estimates in its receive signal processing. Step 730 relates to the lower right block of matrix $D^{(2)}$ in Eq. 49 (interference cancellation) and Eq. 55 (self-interference cancellation).

FIG. 7C is a flow chart of an improved method of amplify-and-forward relay communication in a mobile station that can communicate with a base station through a relay station as described above. In step 742, the mobile station determines the signal gain factor of the relay station based on information in its received signal, e.g., an indication of the gain factor, or the $H_u$ and $H_b$ channel matrices and the $P_b$ and $P_r$ power constraints, or an average of its received signals. In step 744, the mobile station generates an amplified symbol that it intends to include in a wireless signal that the mobile station will transmit to the base station, and thus to the relay station, in a first time slot. As explained above in connection with Eq. 43, for example, an MS symbol is not truly "precoded" but is simply amplified according to the available transmit power at the MS. In step 746, the mobile station transmits a wireless signal that includes the amplified ("precoded") symbol in a first time slot. In step 748, the mobile station receives, in a second time slot that succeeds the first time slot, a relay signal transmitted by the relay station that is based on an estimate by the relay station of a respective symbol transmitted by the base station in the first time slot. In step 750 (see Eq. 54), the mobile station cancels its self-interference between symbols in the received relay signal based on the gain factor and the channel estimate in its receive signal processing.

Figure 8A:
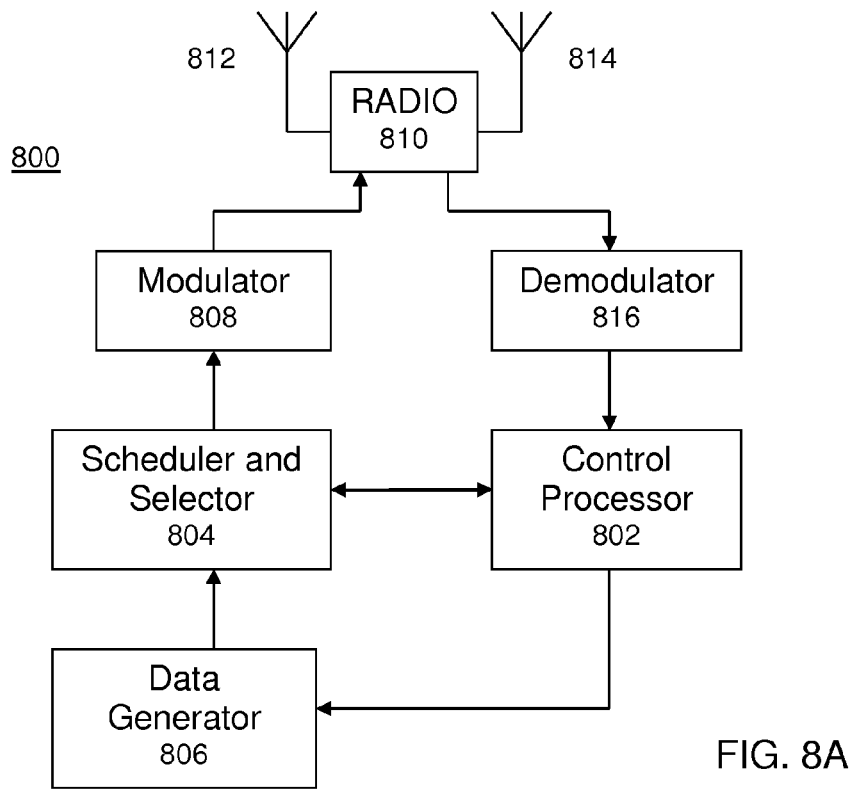
FIGS. 8A, 8B are block diagrams of nodes for a communication network.

FIG. 8A is a block diagram of a portion of a network node 800, such as a relay station, for relaying a first wireless signal from a mobile station to a base station and a second wireless signal from the base station to the mobile station employing the improved relaying methods described above. It will be appreciated that the functional blocks depicted in FIG. 8A can be combined and re-arranged in a variety of equivalent ways, and that many of the functions can be performed by one or more suitably programmed electronic digital signal processor circuits and other known electronic circuits. Moreover, connections among and information provided or exchanged by the functional blocks depicted in FIG. 8A can be altered in various ways to enable a relay station to implement other methods involved in its operation.

The node 800 is operated by a control processor 802, which typically and advantageously is a suitably programmed digital signal processor circuit that provides and receives control and other signals from various devices in the node 800. For simplicity in FIG. 8A, the control processor 802 is shown exchanging information with a scheduler and selector 804, which receives amplified symbol estimates to be transmitted to respective MSs and the BS during the broadcast phase from a suitable data generator 806. The scheduler and selector 804 can be configured to implement resource block and resource element scheduling and selection in an Evolved Universal Terrestrial Access (E-UTRA), or Long Term Evolution (LTE), network, for example, and to implement code allocation in a UTRA network, such as a network using Wideband Code Division Multiple Access (WCDMA) and High-Speed Packet Access (HSPA), for example.

Information from the scheduler and selector 804 is provided to a modulator 808 that uses the information to generate a modulation signal suitable for the particular communication network. The modulator 808 converts the information into modulation symbols that are provided to a suitable radio circuit 810, which impresses the modulation symbols on one or more suitable carrier signals. For example, the modulator 808 in an LTE network is an orthogonal frequency division multiplex (OFDM) modulator, and the radio 810 impresses the modulation symbols on a number of OFDM subcarriers. Thus, the radio circuit 810 generates a wireless signal that is transmitted through at least two antennas 812, 814. Wireless signals transmitted by the MSs and BS are captured by the antennas 812, 814, and provided to the radio 810 and a demodulator 816. The artisan will understand that the same antenna can be used for transmission and reception, as is often done in a wireless communication networks.

Figure 8B:
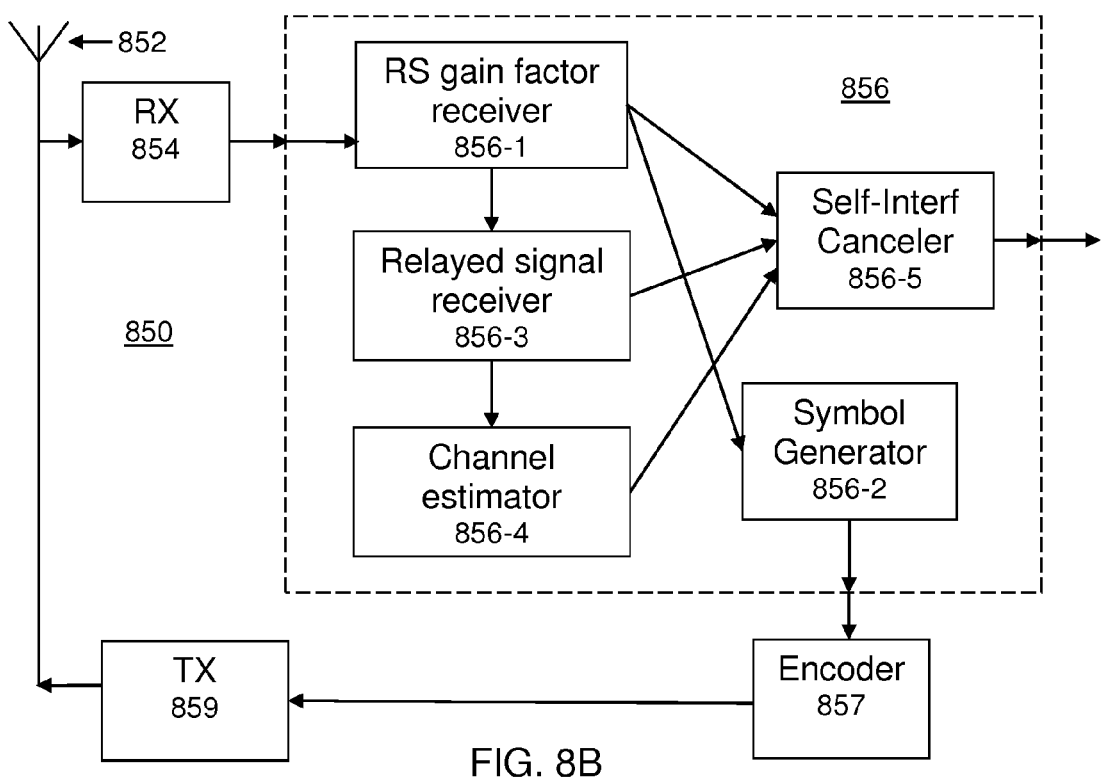

FIG. 8B is a block diagram of an arrangement in an MS, or user equipment (UE), that can implement the improved relaying methods described above. It will be appreciated that the functional blocks depicted in FIG. 8B can be combined and re-arranged in a variety of equivalent ways, and that many of the functions can be performed by one or more suitably programmed digital signal processor circuits and other known electronic circuits. Moreover, connections among and information provided or exchanged by the functional blocks depicted in FIG. 8B can be altered in various ways to enable an MS to implement other methods involved in the operation of the MS.

In the arrangement 850 as depicted in FIG. 8B, an MS receives wireless signals through an antenna 852 and extracts information from the received signals with a suitable receiver (RX) 854. Such information can include an indication of the gain factor of a relay station, and in that respect, a programmable electronic control circuit 856 is configured to implement an RS gain factor receiver 856-1. The control circuit 856 is further configured to implement a symbol generator 856-2 that generates a symbol that the MS intends to include in a wireless signal that the mobile station will transmit to the base station, and thus to the relay station, in a first time slot. The symbol is provided to an encoder 857 that arranges the symbol for transmission in a wireless signal by a transmitter (TX) 859 via the antenna 852 in the first time slot.

The mobile station also receives, in a second time slot that succeeds the first time slot, a relay signal transmitted by the relay station that is based on an estimate by the relay station of a respective symbol transmitted by the base station in the first time slot. Thus, the control circuit 856 is further configured to implement a relayed signal receiver 856-3 that extracts the received symbol. To enable the mobile station to cancel its self-interference from the received relay signal, the control circuit 856 is further configured to implement an otherwise conventional channel estimator 856-4 that generates a channel estimate. The RS gain factor, received symbol, and channel estimate are provided to a self-interference canceller 856-5 implemented by the control circuit 856, and the resulting symbol is provided for further processing in the mobile station.

It will be understood by the artisan that the arrangement 800 depicted in FIG. 8A also represents a portion of a base station employing the improved relaying methods described above. Considering FIG. 8A as a base station, the BS receives wireless signals through the antenna 812, 814 and extracts information from the received signals with the radio 810 and demodulator 816. Such information can include indications of channel estimates of the communication channels between a relay station and a plurality of mobile stations, and optionally an indication of the gain factor of a relay station. Accordingly, the programmable control processor circuit 802 is configured to implement an MS-RS channel estimate receiver. With the data generator 806, the control processor 802 is further configured to implement a precoded symbol generator that generates respective precoded symbols for the plurality of mobile stations that the BS intends to include in a wireless signal that the base station will transmit in a first time slot. The precoded symbols are provided to the scheduler and selector 804 that arranges the symbols for transmission in a wireless signal by the modulator 808 and radio 810 via the antennas 812, 814 in the first time slot.

The base station also receives, in a second time slot that succeeds the first time slot, a relay signal transmitted by the relay station that is based on estimates by the relay station of respective symbols transmitted by the plurality of mobile stations in the first time slot. Thus, the control processor 802 is further configured to implement a relayed signal receiver that extracts the received symbols from the received wireless signal processed by the radio 810 and demodulator 816. To enable the base station to cancel interference and its self-interference from the received relay signal as described above, the control processor 802 is further configured to implement an interference canceller that uses the MS-RS channel estimates and received, or computed, RS gain factor. The resulting symbols are provided for further processing in the base station.

The invention described here can be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any device that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, and an erasable programmable read-only memory (EPROM or Flash memory).

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions can be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way.

What is claimed is:

1. A method in a node for a cellular communication system of relaying respective first wireless signals from a plurality of mobile stations to a base station and a second wireless signal from the base station to the plurality of mobile stations, comprising:
    receiving the first and second wireless signals through at least two antennas in the node during a first time slot of two successive time slots, wherein each of the first wireless signals includes a respective symbol and the second wireless signals includes a plurality of symbols;
    generating respective estimates of the symbols in the first and second wireless signals received during the first time slot, wherein generating includes canceling interference between symbols based on respective first estimates of a channel characteristic of respective first communication channels between the mobile stations and the node and on a second estimate of a channel characteristic of a second communication channel between the base station and the node;
    generating a first relay signal based on the estimates of the symbols of the first wireless signals and a second relay signal based on the estimates of the plurality of symbols of the second wireless signal, wherein generating includes:
    precoding the estimates of the symbols in the first and second wireless signals received during the first time slot, wherein precoding includes amplifying estimates by a gain factor, and canceling interference between the symbols;
    providing the gain factor to the plurality of mobile stations; and
    providing the first estimates of the channel characteristic to the base station,
    wherein the gain factor is determined based on a channel estimate of a communication channel between the mobile stations and the node, a channel estimate of a communication channel between the node and the base station, and respective maximum transmit powers of the node and the base station.

2. The method of claim 1, further comprising transmitting the first and second relay signals through the at least two antennas during a second time slot of the two successive time slots.

3. The method of claim 2, wherein the first and second wireless signals are orthogonal to the first and second relay signals.

4. The method of claim 1, wherein in generating respective estimates of the symbols in the first and second wireless signals received during the first time slot, interference between symbols is canceled according to:

$$D^{(1)} = H_u^{-1}$$

in which $D^{(1)}$ represents a processing matrix applied by the node to the first and second wireless signals received during the first time slot and $H_u^{-1}$ represents an inverse of a matrix of the first estimates of a channel characteristic of respective first communication channels between the mobile stations and the node.

5. The method of claim 1, wherein the estimates of the symbols in the first wireless signals received during the first time slot are precoded according to:

$$M^{(2)} = \beta_r H_u^{-1,T}$$

in which $M^{(2)}$ represents a transmit processing matrix applied by the node to the estimates of the symbols, $\beta_r$ represents the gain factor, and $H_u^{-1,T}$ represents a transpose of an inverse of a matrix of the first estimates of a channel characteristic of respective first communication channels between the mobile stations and the node.

6. The method of claim 1, wherein the gain factor is provided to the base station.

7. An apparatus for a relay station for a wireless communication network, for relaying first wireless signals from mobile stations to a base station and a second wireless signal from the base station to the mobile stations, comprising:
    a receiver configured for receiving the first and second wireless signals through at least two antennas during a first time slot of two successive time slots, wherein each of the first wireless signals includes a respective symbol and the second wireless signals includes a plurality of symbols;
    a programmable control circuit configured for generating respective estimates of the symbols in the first and second wireless signals received during the first time slot by at least canceling interference between symbols based on respective first estimates of a channel characteristic of respective first communication channels between the mobile stations and the relay station and on a second estimate of a channel characteristic of a second communication channel between the base station and the relay station;
    wherein the programmable control circuit is further configured for generating a first relay signal based on the estimates of the symbols of the first wireless signals and a second relay signal based on the estimates of the plurality of symbols of the second wireless signal by precoding the estimates of the symbols in the first and second wireless signals received during the first time slot, the precoding including amplifying estimates by a gain factor and canceling interference between the symbols; and
    a transmitter configured for providing the gain factor to the plurality of mobile stations and the first estimates of the channel characteristic to the base station,
    wherein the gain factor is determined based on a channel estimate of a communication channel between the mobile stations and the relay station, a channel estimate of a communication channel between the relay station and the base station, and respective maximum transmit powers of the relay station and the base station.

8. The apparatus of claim 7, wherein the transmitter is further configured for transmitting the first and second relay signals through the at least two antennas during a second time slot of the two successive time slots.

9. The apparatus of claim 8, wherein the first and second wireless signals are orthogonal to the first and second relay signals.

10. The apparatus of claim 7, wherein in generating respective estimates of the symbols in the first and second wireless signals received during the first time slot, the programmable control circuit is configured for canceling interference between symbols according to:

$$D^{(1)} = H_u^{-1}$$

in which $D^{(1)}$ represents a processing matrix applied by the relay station to the first and second wireless signals received during the first time slot and $H_u^{-1}$ represents an inverse of a matrix of the first estimates of a channel characteristic of respective first communication channels between the mobile stations and the relay station.

11. The apparatus of claim 7, wherein the programmable control circuit is configured for precoding estimates of the symbols in the first wireless signals received during the first time slot according to:

$$M^{(2)} = \beta_r H_u^{-1,T}$$

in which $M^{(2)}$ represents a transmit processing matrix applied by the relay station to the estimates of the symbols, $\beta_r$ represents the gain factor, and $H_u^{-1,T}$ represents a transpose of an inverse of a matrix of the first estimates of a channel characteristic of respective first communication channels between the mobile stations and the relay station.

12. The apparatus of claim 7, wherein the transmitter is configured for providing the gain factor to the base station.

13. An apparatus for a mobile station for a wireless communication network, wherein a first wireless signal from the mobile station is relayed by a relay station to a base station and a second wireless signal from the base station is relayed by the relay station to the mobile station, comprising:
an antenna for transmitting the first wireless signal during a first time slot of two successive time slots and for receiving the second wireless signal during a second time slot of the two successive time slots, wherein the first wireless signal includes an amplified symbol and the second wireless signal includes a plurality of symbols;
a receiver configured for extracting information from a received second wireless signal;
an electronic control circuit configured
for determining, based on information extracted by the receiver, a gain factor of the relay station;
for extracting a symbol intended for the mobile station from the second wireless signal;
for generating a channel estimate of a communication channel between the mobile station and the relay station;
for canceling self-interference from the symbol intended for the mobile station based on the gain factor and the channel estimate; and
for generating the amplified symbol for the first wireless signal in a first time slot; and
a transmitter configured for generating the first wireless signal including the amplified symbol,
wherein the electronic control circuit is configured for determining the gain factor based on the channel estimate of the communication channel between the mobile station and the relay station, a channel estimate of a communication channel between the relay station and the base station, and respective maximum transmit powers of the relay station and the base station.

14. The apparatus of claim 13, wherein the electronic control circuit is configured for determining the gain factor according to an average based on received second wireless signals.

15. The apparatus of claim 13, wherein the electronic control circuit is configured for canceling self-interference from the symbol according to:

$$y_u = (\beta_r - \hat{\beta}_r)\sqrt{P_u} s_u + \beta_r \beta_b s_b + \beta_r h_u n_r + n_u$$

in which $y_u$ represents the symbol, $\beta_r$ represents the gain factor, $\hat{\beta}_r$ represents an estimate of the gain factor, $P_u$ represents a maximum transmit power of the mobile station, $s_u$ represents an unamplified symbol for the first wireless signal in the first time slot, $\beta_b$ represents a gain factor of the base station, $s_b$ represents a symbol transmitted by the base station in the first time slot, $h_u$ is a vector representing a respective row of an inverse communication channel between the mobile station and the relay station, $n_r$ is a vector representing noise at the relay station, and $n_u$ represents noise at the mobile station.

16. A method in a mobile station for a wireless communication network, wherein a first wireless signal from the mobile station is relayed by a relay station to a base station and a second wireless signal from the base station is relayed by the relay station to the mobile station, the method comprising:
transmitting the first wireless signal during a first time slot of two successive time slots and receiving the second wireless signal during a second time slot of the two successive time slots, wherein the first wireless signal includes an amplified symbol and the second wireless signal includes a plurality of symbols;
extracting information from a received second wireless signal;
determining, based on information extracted, a gain factor of the relay station;
extracting a symbol intended for the mobile station from the second wireless signal;
generating a channel estimate of a communication channel between the mobile station and the relay station;
canceling self-interference from the symbol based on the gain factor and the channel estimate; and
generating the amplified symbol for the first wireless signal in a first time slot,
wherein the gain factor is determined based on the channel estimate of the communication channel between the mobile station and the relay station, a channel estimate of a communication channel between the relay station and the base station, and respective maximum transmit powers of the relay station and the base station.

17. The method of claim 16, wherein the gain factor is determined according to an average based on received second wireless signals.

18. The method of claim 16, wherein self-interference is canceled from the symbol according to:

$$y_u = (\beta_r - \hat{\beta}_r)\sqrt{P_u} s_u + \beta_r \beta_b s_b + \beta_r h_u n_r + n_u$$

in which $y_u$ represents the symbol, $\beta_r$ represents the gain factor, $\hat{\beta}_r$ represents an estimate of the gain factor, $P_u$ represents a maximum transmit power of the mobile station, $s_u$ represents an unamplified symbol for the first wireless signal in the first time slot, $\beta_b$ represents a gain factor of the base station, $s_b$ represents a symbol transmitted by the base station in the first time slot, $h_u$ is a vector representing a respective row of an inverse communication channel between the mobile station and the relay station, $n_r$ is a vector representing noise at the relay station, and $n_u$ represents noise at the mobile station.

19. An apparatus for a base station for a wireless communication network, wherein a first wireless signal from the base station is relayed by a relay station to a plurality of mobile stations and a plurality of wireless signals from the plurality of mobile stations is relayed by the relay station in a second wireless signal to the base station, comprising:
at least two antennas configured for transmitting the first wireless signal during a first time slot of two successive time slots and receiving the second wireless signal during a second time slot of the two successive time slots, wherein the first wireless signal includes a plurality of symbols, each intended for a respective mobile station;

a receiver configured for extracting information from a received second wireless signal;

an electronic control circuit configured for determining, based on information extracted by the receiver, respective channel estimates for communication channels between the relay station and the plurality of mobile stations;

for generating respective precoded symbols for the plurality of mobile stations for the first wireless signal in the first time slot; and for canceling interference and self-interference between symbols in the received second wireless signal based on the respective channel estimates; and a transmitter configured for generating the first wireless signal including the precoded symbols, wherein the electronic control circuit is configured for canceling self-interference from a symbol according to:

$$y_{bi} = \beta_r \sqrt{P_u} s_{ui} + (\beta_r - \hat{\beta}_r) \beta_b s_{bi} + \beta_r h_{ui} n_r + h_{ubi} n_b$$

in which $y_{bi}$ represents a symbol received at the base station from a mobile station i, $\beta_r$ represents a gain factor of the relay station, $P_u$ represents a maximum transmit power of the mobile station i, $s_{ui}$ represents a symbol from the mobile station i in the second wireless signal in the second time slot, $\hat{\beta}_r$ represents an estimate of the gain factor of the relay station, $\beta_b$ represents a gain factor of the base station, $s_{bi}$ represents a symbol intended for the mobile station i, $h_{ui}$ is a vector representing a respective i-th row of an inverse communication channel between the mobile station i and the relay station, $n_r$ is a vector representing noise at the relay station, $h_{ubi}$ is a vector corresponding to an i-th row of a matrix $H_u^T H_b^{-1,T}$ representing channel estimates of communication channels between the mobile stations and the base station, and $n_b$ is a vector representing noise at the base station.

20. The apparatus of claim 19, wherein the electronic control circuit is configured for determining a gain factor of the relay station based on information extracted by the receiver.

21. A method in a base station for a wireless communication network, wherein a first wireless signal from the base station is relayed by a relay station to a plurality of mobile stations and a plurality of wireless signals from the plurality of mobile stations is relayed by the relay station as a second wireless signal to the base station, comprising:

transmitting the first wireless signal during a first time slot of two successive time slots and receiving the second wireless signal during a second time slot of the two successive time slots, wherein the first wireless signal includes a plurality of symbols, each intended for a respective mobile station;

extracting information from a received second wireless signal;

determining, based on information extracted by the receiver, respective channel estimates for communication channels between the relay station and the plurality of mobile stations;

generating respective precoded symbols for the plurality of mobile stations for the first wireless signal in the first time slot;

canceling interference and self-interference between symbols in the received second wireless signal based on the respective channel estimates; and generating the first wireless signal including the precoded symbols, wherein self-interference is canceled from a symbol according to:

$$y_{bi} = \beta_r \sqrt{P_u} s_{ui} + (\beta_r - \hat{\beta}_r) \beta_b s_{bi} + \beta_r h_{ui} n_r + h_{ubi} n_b$$

in which $y_{bi}$ represents a symbol received at the base station from a mobile station i, $\beta_r$ represents a gain factor of the relay station, $P_u$ represents a maximum transmit power of the mobile station i, $s_{ui}$ represents a symbol from the mobile station i in the second wireless signal in the second time slot, $\hat{\beta}_r$ represents an estimate of the gain factor of the relay station, $\beta_b$ represents a gain factor of the base station, $s_{bi}$ represents a symbol intended for the mobile station i, $h_{ui}$ is a vector representing a respective i-th row of an inverse communication channel between the mobile station i and the relay station, $n_r$ is a vector representing noise at the relay station, $h_{ubi}$ is vector corresponding to an i-th row of a matrix $H_u^T H_b^{-1,T}$ representing channel estimates of communication channels between the mobile stations and the base station, and $n_b$ is a vector representing noise at the base station.

22. The method of claim 21, further comprising determining a gain factor of the relay station based on information extracted by the receiver.

* * * * *